United States Patent

Kitaoka

Patent Number: 5,911,944
Date of Patent: Jun. 15, 1999

[54] METHOD FOR PRODUCTION OF FIBER

[75] Inventor: Kenji Kitaoka, Kawanishi, Japan

[73] Assignee: Minolta Co., Ltd., Osaka-fu, Japan

[21] Appl. No.: 08/886,040

[22] Filed: Jun. 30, 1997

[30] Foreign Application Priority Data

| Jun. 28, 1996 | [JP] | Japan | 8-168826 |
| Jun. 28, 1996 | [JP] | Japan | 8-168827 |
| Jun. 26, 1997 | [JP] | Japan | 9-170540 |

[51] Int. Cl.$^6$ ............................................. C04B 35/624
[52] U.S. Cl. ............... 264/622; 264/623; 264/211.11; 264/DIG. 19; 501/12
[58] Field of Search ............................ 264/622, 623, 264/211.11, DIG. 19; 501/12

[56] References Cited

U.S. PATENT DOCUMENTS

| 3,632,709 | 1/1972 | Hayes et al. | 264/623 |
| 3,846,527 | 11/1974 | Winter et al. | 264/623 |
| 4,010,233 | 3/1977 | Winter et al. | 264/623 |
| 4,921,328 | 5/1990 | Seth | 350/364 |
| 5,072,035 | 12/1991 | Chen et al. | |
| 5,670,103 | 9/1997 | Pak | 262/622 |

FOREIGN PATENT DOCUMENTS

| 60-170828 | 9/1985 | Japan . |
| 63-101817 | 5/1988 | Japan . |
| 7-31315 | 4/1995 | Japan . |

OTHER PUBLICATIONS

Walter Glaubitt, Dieter Sporn and Rainer Jahn, "*Sol–Gel Processing of PZT Long Fibers*," Intelligent Materials and Systems (1995) pp. 47–54.

Jian Kang, Toshinobu Yoko, Hiromitsu Kozuka and Sumio Sakka, "*Preparation of Pb–Based Complex Perovskite Coating Films by Sol–Gel Method*," Proceedings of SPIE, vol. 1758, Sol–Gel Optics II, San Diego, CA (1992) pp. 249–260.

*Primary Examiner*—James Derrington
*Attorney, Agent, or Firm*—Burns, Doane,Swecker & Mathis, L.L.P.

[57] ABSTRACT

A method for the production of a fiber comprises a first step of dispersing a raw material containing at least one of a metal hydrate and a hydrated metal compound in an alcohol-based solvent having a boiling point of not lower than 70° C. thereby preparing a sol solution, a second step of heating the sol solution obtained in the first step at a temperature of not higher than 100° C. thereby polymerizing the raw material and effecting conversion thereof to a complex and subsequently concentrating the complex until it manifests spinnability, a third step of stretching the sol solution obtained at the end of the second step into a fiber precursor thereby effecting gelation thereof, and a fourth step of heating the gelatinized fiber precursor thereby producing a fiber.

By this method of production, a fiber of homogeneous and dense metal oxide having a high assay is obtained without inducing such impurities as precipitate in the course of manufacture. The fiber of such material as PLZT possessed of an optoelectronic property which is produced by the method mentioned above is utilized for the manufacture of a compact and highly integrated optoelectronic modulator.

10 Claims, 12 Drawing Sheets

Fig. I

METHOD FOR PRODUCTION OF FIBER

BACKGROUND OF THE INVENTION

1. Field of the Invention

This invention relates to a method for the production of a fiber of such a material as metal oxide and an optoelectronic modulator. More particularly, this invention relates to a method for the production of a fiber in accordance with the sol-gel technique and an optoelectronic modulator using the fiber so obtained.

2. Related Art

Researches have been heretofore under way concerning the applications of metal oxides for functional elements by virtue of various characteristic properties owned by the metal oxides. For example, (Pb, La) (Zr, Ti)$O_3$ (hereinafter referred to as "VPLZ") is known to possess a crystalline structure of the perovskite type and manifest a prominent secondary optoelectronic effect (Kerr effect).

If such metal oxide is enabled to form a fiber, the range of applications of the metal oxide to the products utilizing the characteristic properties mentioned above will be widened and the development of new devices using the fiber will be realized.

As a means for manufacturing a metal oxide into a fiber, a method of production by means of a solid-phase reaction which comprises mixing the oxides or carbonates of prescribed component elements, subjecting the resultant mixture to a pyrogenic reaction in the air, and sintering the produced powdery raw material has been known. The solid-phase reaction, however, is such that the component elements are not intermingled to the molecular level homogeneously and the resultant mixture, when sintered, tend to produce an impure phase or a heterogeneous portion in the bulk because the powder raw material produces a fiber having a diameter of the order of microns only with extreme difficulty and because the reaction suffers metal ions from the oxides or carbonates of the component elements to migrate past grain boundaries. Further, since this method utilizes a reaction at an elevated temperature, it consumes a large volume of energy and proves expensive from the viewpoint of industrial chemistry.

Further, the "sol-gel method" for obtaining a synthetic metal oxide fiber by hydrolyzing or polymerizing the raw material in the state of a sol, one form of the liquid state, into the fiber in the state of a gel has been also known. The metal oxide synthesized by the sol-gel method enjoys homogeneity to the molecular level and assumes a state rich in density and scanty of an impurity phase as compared with the bulk synthesized by the solid-phase reaction. Further, since the reaction occurs in a liquid state, it consumes energy only in a small amount and proves advantageous in terms of cost as compared with the solid-phase reaction.

The sol-gel method has been known from U.S. Pat. No. 4,921,328 and the dissertation "Sol-Gel Processing of PZT Long Fiber", Walter Glaubitt, Dieter Sporn, and Rainer Jahn, Intelligent Materials and System (1995) pp. 47–54.

U.S. Pat. No. 4,921,328 covers an invention which concerns an inorganic polycrystalline ferroelectric fiber and a fiber-in-line optoelectronic modulator. It discloses a method for the production of a PLZT fiber by a sol-gel process using 2-methoxyethanol as a solvent, hydrated lead acetate, hydrated lanthanum acetate, zirconium propoxide, and titanium propoxide as metal sources, and nitric acid as a catalyst.

By this method of production disclosed in U.S. Pat. No. 4,921,328, the hydrated lead acetate and the hydrated lanthanum acetate as the raw materials are heated at 165° C. for 15 minutes. This step is aimed at depriving the hydrates of the water of crystallization. It has been reported, however, that the removal of the water of crystallization results in producing a precipitate destined to constitute impurities [J. Kang, T. Yoko, H. Kozuka, and S. Sakka, "Preparation of Pb-Based Complex Perovskite Coating Film by Sol-Gel Method", pp. 249–260, Proceedings of SPIE, Vol. 1758, Sol-Gel Optics II, San Diego, Calif., 1992]. The removal of the water of crystallization ought to be avoided to preclude the formation of the precipitate.

As a technique which shuns the removal of the water of crystallization, the method disclosed in the aforementioned dissertation by Glaubitt et al. may be cited. This method amounts to an improvement in the conventional method which resides in depriving the hydrate as the raw material of the water of crystallization while using 2-methoxyethanol as a solvent and converting what remains after the removal into a complex. It obviates the necessity for removing the water of crystallization by accomplishing necessary carboxylation by using propionic acid as a solvent The use of propionic acid, however, tends to induce generation of an unnecessary functional group. This functional group is coupled with such other groups as a carboxyl group and the product of the coupling is liable to gasify during the course of heating in the production of a fiber and compel the final product to assume a porous structure as noted from the SEM photograph of the final product annexed to the dissertation.

The optoelectronic modulation utilizing a fiber has been known from JP-A-60-170,828, for example. This patent publication discloses a PLZT optical shutter array element produced by the application of the technique of photolithography. This optical shutter array element is produced by chemically etching a flat plate of PLZT thereby incising grooves therein for the installation of an electrode, then depositing a metallic material on the side of the PLZT plate containing the grooves by means of vacuum evaporation, and again chemically etching the same side of the PLZT plate thereby imparting a prescribed pattern to the electrode.

JP-B-07-31,315 proposes an optical shutter array element which is produced by preparing a flat plate of PLZT having a thin metallic film, a precursor for an electrode, deposited thereon by vacuum evaporation and precision machining the PLZT plate with a diamond cutter thereby forming grooves of a prescribed depth as spaced with a prescribed pitch.

The optical shutter array element disclosed in JP-A60-170,828, however, is at a disadvantage in requiring an extremely complicated process of high-precision fabrication. It also has the problem that since the grooves are produced by chemical etching and, as a result, the grooves are not allowed to have a large depth and the light path is not allowed to have a large length, the shutter element inevitably requires a high voltage for its operation.

The optical shutter array element disclosed in JP-B07-31, 315 has the problem that since the diamond cutter is used in fabricating the PLZT plate and, therefore, the pitch of the arrays cannot be decreased, the element allows compaction and high integration only with difficulty.

OBJECTS AND SUMMARY

This invention, incited by the true state of the prior art mentioned above, has for an object thereof the provision of a method for the convenient production of a fiber of high purity without entailing the occurrence of impurities such as a precipitate during the course of the production.

Another object of this invention is to provide a method for the convenient production of a fiber of homogeneous-and dense texture.

Yet another object of this invention is to provide a compact and highly integrated optoelectronic modulator.

To accomplish the objects mentioned above, this invention provides a method for the production of a fiber which comprises a first step of dispersing a raw material containing at least one of metal hydrates and hydrated metal compounds in an alcohol-based solvent having a boiling point of not lower than 70° C. thereby preparing a sol solution, a second step of heating the sol solution obtained in the first step at a temperature of not higher than 100° C. thereby polymerizing the raw material and effecting the conversion thereof to a complex and subsequently concentrating the complex until it manifests spinnability, a third step of stretching the sol solution obtained at the end of the second step into a fiber precursor thereby effecting the gelation thereof, and a fourth step of heating the gelatinized fiber precursor thereby producing a fiber.

This invention further concerns the method of production, wherein a unidentate ligand or multidentate ligand capable of forming a metal complex with the alcohol-based solvent is used additionally in the first step.

This invention further concerns the method of production, wherein the unidentate ligand or multidentate ligand forming the metal complex is an amine-based ligand.

This invention further concerns the method of production, wherein neither an acid catalyst nor a basic catalyst is used in the second step.

This invention further concerns the method of production, wherein the raw material has a composition containing at least one element selected from Pb, La, and Bi and at least one element selected from Zr, Ti, Ni, Nb, Fe, and W as metal components.

This invention further concerns the method of production, wherein the raw material has a composition containing at least one element between Pb and La and at least one element between Zr and Ti as metal components.

This invention further concerns the method of production, wherein the raw material has a composition containing Pb and at least one element between Zr and Ti as metal components.

This invention further concerns the method of production, wherein the hydrated metal compound or the other metal compound contained in the raw material is at least one compound selected from the group consisting of alkoxides, acetates, and acetyl acetonates of metals.

This invention further concerns the method of production, wherein the alcohol-based solvent is one member selected from the group consisting of ethanol, n-propanol, isopropanol, n-butanol, isobutanol, 2-methoxyethanol, 2-ethoxyethanol, and the mixtures thereof.

This invention further concerns the method of production, wherein the sol solution incorporates water therein from at least one water source among the water of crystallization of the hydrate, the water in the solvent, and the moisture in the air at the first step.

The method of this invention for the production of a fiber enables such a metal oxide fiber as has never been manufactured by the conventional solid-phase reaction or vacuum film formation to-be produced by a convenient procedure. This procedure allows the fiber to be manufactured in high purity with a homogeneous and dense texture without entailing the occurrence of impurities such as a precipitate.

This invention provides an optoelectronic modulator, which is characterized by comprising a plurality of fibers possessed of an optoelectronic property, a retaining member for retaining the plurality of fibers substantially in parallel, and voltage applying means for applying an electric field to the plurality of fibers and altering the optoelectronic property thereof.

This invention further concerns the optoelectronic modulator, wherein the retaining member is a substrate having formed therein a plurality of grooves for seating the plurality of fibers substantially in parallel thereon.

This invention further concerns the optoelectronic modulator, wherein the voltage applying means further comprises a common electrode collectively contacting all the plurality of fibers disposed on the surface of the substrate as the retaining member, discrete electrodes disposed at the surface positions other than the positions of contact of the individual fibers with the common electrode, and a drive voltage power source for applying a voltage between the common electrode and the discrete electrodes.

This invention further concerns the optoelectronic modulator, wherein the common electrode is formed of an adhesive agent possessing electroconductivity.

This invention further concerns the optoelectronic modulator, wherein the gaps between the substantially parallel arranged fibers are filled with a light-intercepting filler having a lower refractive index than the raw material for fiber.

This invention further concerns the optoelectronic modulator, wherein the end parts of the fibers on one side are severally extended in one direction and the end parts thereof on the side are bundled.

This invention further concerns the optoelectronic modulator, wherein the fibers have a composition containing at least one element selected from Pb, La, and Bi and at least one element selected from Zr, Ti, Ni, Nb, Fe, and W.

This invention further concerns the optoelectronic modulator, wherein the fibers are obtained by a procedure comprising a first step of dispersing a raw material containing at least one element selected from Pb, La, and Bi and at least one element selected from Zr, Ti, Ni, Nb, Fe, and W as metal components and having contained therein at least one of the metals or the compounds of such metals in the form of a hydrate in an alcohol-based solvent having a boiling point of not lower than 70° C. thereby preparing a sol solution, a second step of heating the sol solution obtained at the first step at a temperature of not higher than 100° C. thereby polymerizing the raw material and effecting the conversion thereof to a complex and subsequently concentrating the complex until it manifests spinnability, a third step of stretching the sol solution obtained at the end of the second step into a fiber precursor thereby effecting the gelation thereof, and a fourth stop of heating the gelatinized fiber precursor thereby producing a fiber.

Though the optoelectronic modulator of this invention operates at a low voltage, enjoys compactness of structure, and permits high integration, it can be manufactured with ease.

PREFERRED EMBODIMENTS

Figure 1:
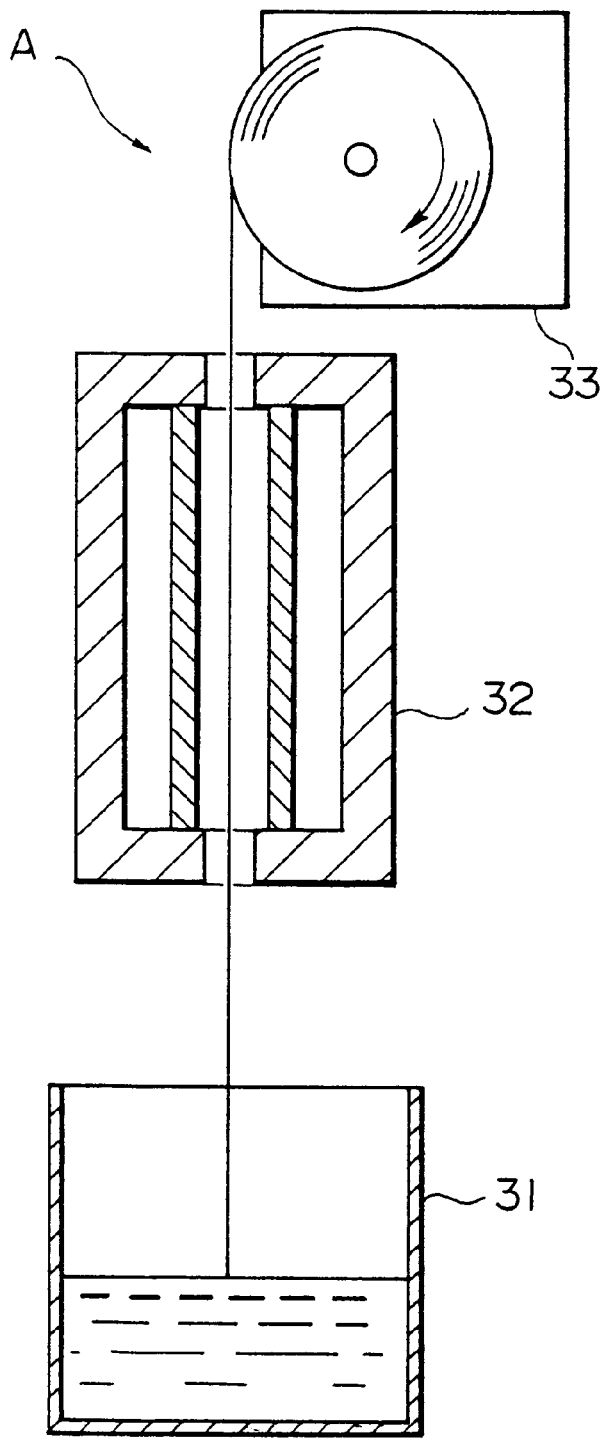
FIG. 1 is a model diagram illustrating the construction of a fiber forming apparatus A to be used in one embodiment of the method of this invention for the production of a fiber.

Now, this invention will be described in detail below with reference to the preferred embodiments thereof.
Method for production of fiber This invention is directed to a method for the production of a fiber, which is characterized by comprising a first step of dispersing a raw material containing at least one of metal hydrates and hydrated metal compounds in an alcohol-based solvent having a boiling point of not lower than 70° C. thereby preparing a sol solution, a second step of heating the sol solution obtained at the first step at a temperature of not higher than 100° C. thereby polymerizing the raw material and effecting the conversion thereof to a complex and subsequently concentrating the complex until it manifests spinnability, a third step of stretching the sol solution obtained at the end of the second step into a fiber precursor thereby effecting the gelation thereof, and a fourth step of heating the gelatinized fiber precursor thereby producing a fiber.

The method for the production of a fiber according to this invention relies on the sol-gel process to obtain the fiber and comprises a first step of mixing a metal or a metal compound with a solvent thereby preparing a homogeneous sol solution, a second step of heating and concentrating the sol solution obtained at the first step at a temperature approximating closely to the boiling point of the solvent until the solution manifests spinnability, a third step of forming the sol solution obtained at the second step in the form of a fiber (fiber precursor) and then gelatinizing the fiber, and a fourth step of crystallizing the gelatinized fiber precursor obtained at the third step by a heat-treatment. The conditions mentioned in the component steps of the sol-gel process have been defined for enabling a fiber of excellent quality to be manufactured by a simple operation particularly where at least one member selected from the group consisting of metals and metal compounds to be used as the raw material is in the form of a hydrate.

The first step mentioned above is intended for preparing a homogeneous sol solution by mixing a metal or a metal compound with a solvent. The metal compound to be used herein as a starting material may be an organic or an inorganic compound. It is preferred to be a compound containing at least one member selected from the group consisting of alkoxides, acetates, and acetyl acetonates of metals. The alkoxides, acetates, and acetyl acetonates of metals have the nature of producing a metaloxan bond (M-O-M: wherein M stands for a metal element) in response to hydrolysis. This bond between compounds is a construction suitable for causing the sol solution to manifest spinnability.

In place of a compound which contains such an alkoxide, acetate, or acetyl acetonate of metal as mentioned above, the starting material may be a compound which is capable of synthesizing such a compound, when hydrolyzed or polymerized under prescribed conditions. A simple metal, a chloride, or a nitride, for example, indeed is incapable of forming the metaloxan bond in its unmodified form. It is enabled to synthesize an alkoxide, an acetate, or an acetyl acetonate, however, when it is subjected to the chemical reaction under prescribed conditions.

The metal or the metal compound as the starting material is preferred to be in such a composition as to contain at least one element selected from Pb, La, and Bi and at least one element selected from Zr, Ti, Ni, Nb, Fe, and W as metal components. When the metal or the metal compound is formed of this composition, the finally formed crystallized metal oxide fiber contains crystals of an optoelectronic property and, consequently, permits manufacture of such a functional element as an optical shutter element. Particularly the metal or metal compound as the starting material is preferred to have a composition containing at least one element of Pb and La and at least one element of Zr and Ti or, better still, a composition containing Pb and at least one element of Zr and Ti, as metal components.

The method of production according to this invention uses, for the starting material mentioned above, the hydrate of a metal or a metal compound as at least one metal or metal compound.

The term "hydrate" as used in the present specification refers to a molecular compound produced by the combination of water with other compound or atom. The term "hydrate of a metal compound" is defined as such a metal compound as mentioned above which contains the water of crystallization.

In this invention, this hydrate is preferably used because a hydrated acetate, hydrated chloride, or hydrated nitrate which represents the hydrated metal compounds is generally at an advantage in easily forming a homogeneous sol, manifesting high solubility in an alcohol-based solvent, and not costing dearly as compared with alkoxide, etc. The fact that various metal compounds which are commercially available as raw materials are more often than not in the form of a hydrate actually is a contributory factor.

As typical examples of the hydrate of a metal or a metal compound, hydrated acetates such as lead acetate trihydride and lanthanum acetate 1.5 hydride, hydrated chlorides such as lanthanum chloride heptahydride and nickel chloride hexahydride, hydrated nitrates such as lanthanum nitrate hexahydride, nickel nitrate hexahydride, and bismuth nitrate pentahydride, and hydrated acetyl acetone complex salts such as nickel acetyl acetonate dihydride and lead acetyl acetonate dihydride, and soon maybe cited. The hydrated metal compounds which are usable for this invention do not need to be limited in any respect to the compounds cited herein by way of example.

The solvent is preferred to be an alcohol-based solvent because the alcohol-based solvent possesses an outstanding ability to dissolve homogeneously a metal, a metal compound, or a hydrate thereof. This ability to form a homogeneous solution is manifested particularly prominently when the metal or metal compound is incorporated in the form of an alkoxide, acetate, or acetyl acetonate into the sol.

The alcohol-based solvent proves preferable also in respect that it is stable in the presence of a metal, a metal oxide, or a hydrate thereof and is incapable of introducing any unnecessary functional group therein.

The alcohol-based solvent to be used in this invention is preferred to have a boiling point of not lower than 70° C. because the metal compound or the hydrate thereof more often than not requires to be heated to be dissolved in the alcohol-based solvent. For example, lead acetate trihydride must be heated to a temperature exceeding about 65° to 70° C., lanthanum isopropoxide to a temperature exceeding about 70° C., and tungsten ethoxide to a temperature exceeding about 70° C. For the purpose of preventing the solvent from being vaporized by the heating required for the solution mentioned above, the boiling point of the solvent must be not lower than 70° C.

As typical examples of the alcohol-based solvent which has a boiling point of not lower than 70° C., ethanol, n-propanol, isopropanol, n-butanol, isobutanol, 2-methoxyethanol, and 2-ethoxyethanol may be cited. These solvents may be used either singly or in the form of a mixture of two or more members.

The alcohol-based solvent can be suitably selected from those cited above in consideration of the dissolving power, the safety, etc. manifested thereby on the metal compound to be used. Particularly for the use in this invention, the alcohol-based solvent is preferred to be 2-methoxyethanol or the mixture of 2-methoxyethanol with ethanol. Since 2-methoxyethanol is excellent in terms of the dissolving power and the safety to be manifested on metal compounds, the use thereof as a solvent facilitates the preparation of the sol solution at the first step. Meanwhile, 2-methoxyethanol has a toxicity as compared with ethanol. Since the substantial portion of the solvent is vaporized while the sol solution is concentrated as will be specifically described herein below, it is appropriate to decrease to the fullest possible extent the amount of such a toxic solvent to be used. From the viewpoint of safety, the mixture of 2-methoxyethanol with ethanol proves favorable.

The sol solution which is prepared at the first step of this invention may add with water, because water is necessary for the synthesis of the metaloxan bond mentioned above.

This addition of the water may be accomplished by adding water to the solvent to be used during the preparation of the sol solution. Otherwise, the water may be introduced from at least one of the sources, i.e. the water of crystallization of the hydrate of a metal or a metal compound, the water content of the alcohol as the solvent, and the moisture in the air. The introduction of water from the water of crystallization of the hydrate, the water in the solvent, or the moisture in the air facilitates the procedure of water addition by obviating the necessity for an elaborate step devoted to the addition of water.

The mixing ratio of the water which is added during the preparation of the sol solution to the raw material, such as hydrate of metal or metal compound, is preferred to be such that the number of mols of the water may be 0.5 to 4 times that of mols of the metal ion. If the sol solution adds absolutely no water, it will incur difficulty in being converted into a spinnable sol at the second step to be described specifically herein below because neither hydrolysis nor polymerization is induced at all and no bond is formed between metal ions. Conversely, if the sol solution adds water excessively, the possibility of the sol being converted into a gel, deprived of fluidity, and prevented from manifesting spinnability will ensue because it undergoes hydrolysis and polymerization excessively and suffers inevitable growth of a three-dimensional network structure.

At the first step, the sol solution may additionally use a unidentate ligand or a multidentate ligand (the latter ligand is generally called as "a chelating agent") which forms a metal complex with an alcohol-based solvent.

The alcohol-based solvent is effective in preventing the metal raw material from producing an unnecessary functional group. For the purpose of precluding the occurrence of a precipitate in the produced sol solution, the operation of the first step must be performed at such a temperature as induces no removal of the water of crystallization in the hydrate of a metal or metal compound which is used as at least part of the metal material. Specifically, this operation is not allowed to proceed at a temperature exceeding 100° C. as will be specifically pointed out herein below. If some of metals or the metal compounds to be used are those which have low solubility in the alcohol-based solvent, a lanthanum-based substance, for example, which is sparingly soluble in the alcohol-based solvent, the yield will not be easily augmented. When the metal or the metal compound of this nature is used, it is preferred to improve the apparent solubility thereof by using a unidentate ligand or a multidentate ligand capable of forming a metal complex in combination therewith.

The unidentate ligand or the multidentate ligand which forms a metal complex is preferred to be based on an amine. As typical examples of the ligand, monoethanol amine, diethanol amine, diethylene triamine, and ethylene diamine tetraacetic acid may be cited. The ligand which can be used in this invention does not need to be limited to these examples.

The unidentate ligand or the multidentate ligand is preferred to be based on an amine because the amine-based compound contains a donor atom N capable of forming a coordinate bond with a metal atom, allows a metal material having low solubility in the alcohol-based solvent to coordinate a metal ion therein and alter polarity and acquire an increase in the solubility in the alcohol-based solvent. The amine-based ligand, therefore, improves the solubility of the metal material and facilitates the preparation of a homogeneous sol.

In the preparation of the sol solution at the first step in the method of production of this invention, when the fiber to be produced is PLZT and PZT, there exists the preferred sequence in which the components of the solution are added dropwise during the course of the first step. When the solution having solved therein the hydrate of a metal compound or the raw material thereof and the solution containing an anhydrous metal raw material are to be mixed, it is advantageous for the sake of preparing a homogeneous sol solution to have the water-containing solution gradually added dropwise to the solution containing the anhydrous metal material.

When the sol solution is prepared in the manner described above at the first step, this sol solution is then heated at the second step to polymerize the metal material and convert it into a complex The heating in this case must be made at a temperature of not higher than 100° C. The reason for this limit on temperature is that as aptly reported by J. Kang, T. Yoko, H. Kozuka, and S. Sakka, "Preparation of Pb-Based Complex Perovskite Coating Film by Sol-Gel Method," pp. 249–260, Proceedings of SPIE, Vol. 1758, Sol-Gel Optics II, San Diego, Calif., 1992, the operation at a higher temperature inevitably results in the induction of a precipitate as an impurity when the water of crystallization is removed from a lead-based hydrate, for example.

In the present invention, therefore, the heating up to the conversion of the metal material into a complex at the second step, namely up to the concentration of the sol solution to the extent of manifesting spinnability, is made at a temperature of not higher than 100° C. lest the heating should induce removal of the water of crystallization.

Further, when the alcohol-based solvent has a boiling point of not higher than 100° C., the heating is preferred to be made at a temperature not exceeding this boiling point. The reason for this limit of temperature is that the heating, when made at a temperature higher than the melting point, inevitably induces the vaporization of the solvent.

When the work of dissolving the metal material in the alcohol-based solvent at the first step mentioned above necessitates application of heat, the temperature of this heating must be kept below 100° C. for the same reason as mentioned above.

At the second step, after the metal material has been converted into a complex as described above, the complex is thermally concentrated so as to expel the solvent component by vaporization, heighten the viscosity of the complex, and promote polycondensation of the material, with the result that the complex will form a minute sol enjoying high viscosity, and manifesting spinnability. The manifestation of spinnability may be accomplished by concentration under a reduced pressure in place of the application of heat.

In a preferred embodiment of this invention, the sol is enabled to acquire high viscosity and manifest spinnability by fulfilling the expulsion of the solvent component by vaporization and consequently heightening the viscosity owing to the partial hydrolysis by addition of water and the heating without addition of a catalyst.

When an acid catalyst or a basic catalyst is added, since the hydrolysis and the polymerization proceed with the elapse of time, the reaction proceeds with time and the high viscous sol changes viscosity momentarily even while the fiber precursor formed at the subsequent third step is being transformed into a fiber. In contrast, when no catalyst is added, since the viscosity of the sol solution is controlled solely by heating, the viscosity can be heightened without inducing any change in the structure of the metal oxide. In the case of this invention, since the sol solution is destined to be given the shape of a fiber and the formed fiber has a very large surface area, the solvent component can be fully expelled by vaporization and the highly viscous sol can be thoroughly gelatinized by the vaporization of the solvent component without requiring the addition of a catalyst in order to promote the hydrolysis and the polymerization. Because neither an acid catalyst nor a basic catalyst is contained, the possibility that the metallic part of the production equipment will be deteriorated by corrosion is nil.

The heating induces the sol solution to undergo hydrolysis and polymerization simultaneously. For example, the following reactions are generated.

$Pb(CH_3COO)_2 + Ti(OPr^i)_4 + H_2O \rightarrow (CH_3COO)Pb-O-Ti(OPr^i)_3 + CH_3COOH + Pr^iOH$ 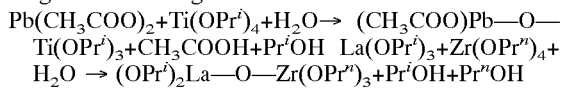 $La(OPr^i)_3 + Zr(OPr'')_4 + H_2O \rightarrow (OPr^i)_2La-O-Zr(OPr'')_3 + Pr^iOH + Pr''OH$ At the third step in the method of production of this invention, the highly viscous spinnable sol solution obtained at the second step is formed as a fiber precursor and gelatinized.

Specifically, this conversion is accomplished by a method which comprises drawing the highly viscous sol upward and giving the shape of a fiber to the extended thread of the sol and a method which comprises discharging the highly viscous through a minute orifice and giving the shape of a fiber to the discharged thread of sol.

This step is necessary for stably imparting a required diameter of the order of microns to the fiber.

At the fourth step, the gel fiber precursor is crystallized by a heat treatment into a finished fiber.

In a preferred embodiment of this invention, the highly viscous sol solution is manufactured into the finished fiber by the use of a fiber forming device which is adapted to carry out the third and the fourth step mentioned above continuously.

FIG. 1 depicts one example of the production device to be used for the continuous method of production. A fiber forming device A is mainly composed of a container 31 for storing the highly viscous sol, a heater unit 32 for heating the fiber precursor which has been pulled up from the highly viscous sol solution and then gelatinized, and a rewinding unit 33 for taking up the finished fiber. In this fiber forming device A, a pin of a sharp point is dipped temporarily into the surface part of the highly viscous sol stored in the container 31 and then pulled up to draw continuously the highly viscous sol in the shape of a fiber from the surface portion. This continuous fiber drawn from the highly viscous sol is then passed through the heater unit 33 and taken up on the rewinding unit 33. The rewinding unit 33 is rotated at a fixed rate by a motor (not shown) and enabled to take up the fiber sequentially.

In the construction described above, the fiber freshly drawn from the highly viscous sol is in the form of sol. As it is pulled up further, it is gradually converted into a gel fiber (fiber precursor) while emitting the solvent component therefrom by vaporization. This gel fiber, while in the heater unit 32, is crystallized by heating at a temperature (not lower than 600° C. in the case of PLZT) enough for precipitating the metal oxide in a crystal phase to produce the fiber, e.g. a PLZT fiber possessed of an optoelectronic property aimed at. In the fiber forming device A according to the present preferred embodiment, the diameter of the fiber can be varied by varying the viscosity of the highly viscous sol and the speed of rotation of the rewinding unit 33. For the purpose of producing the fiber of a prescribed diameter, it suffices to adjust suitably these operating factors.

Figure 2:
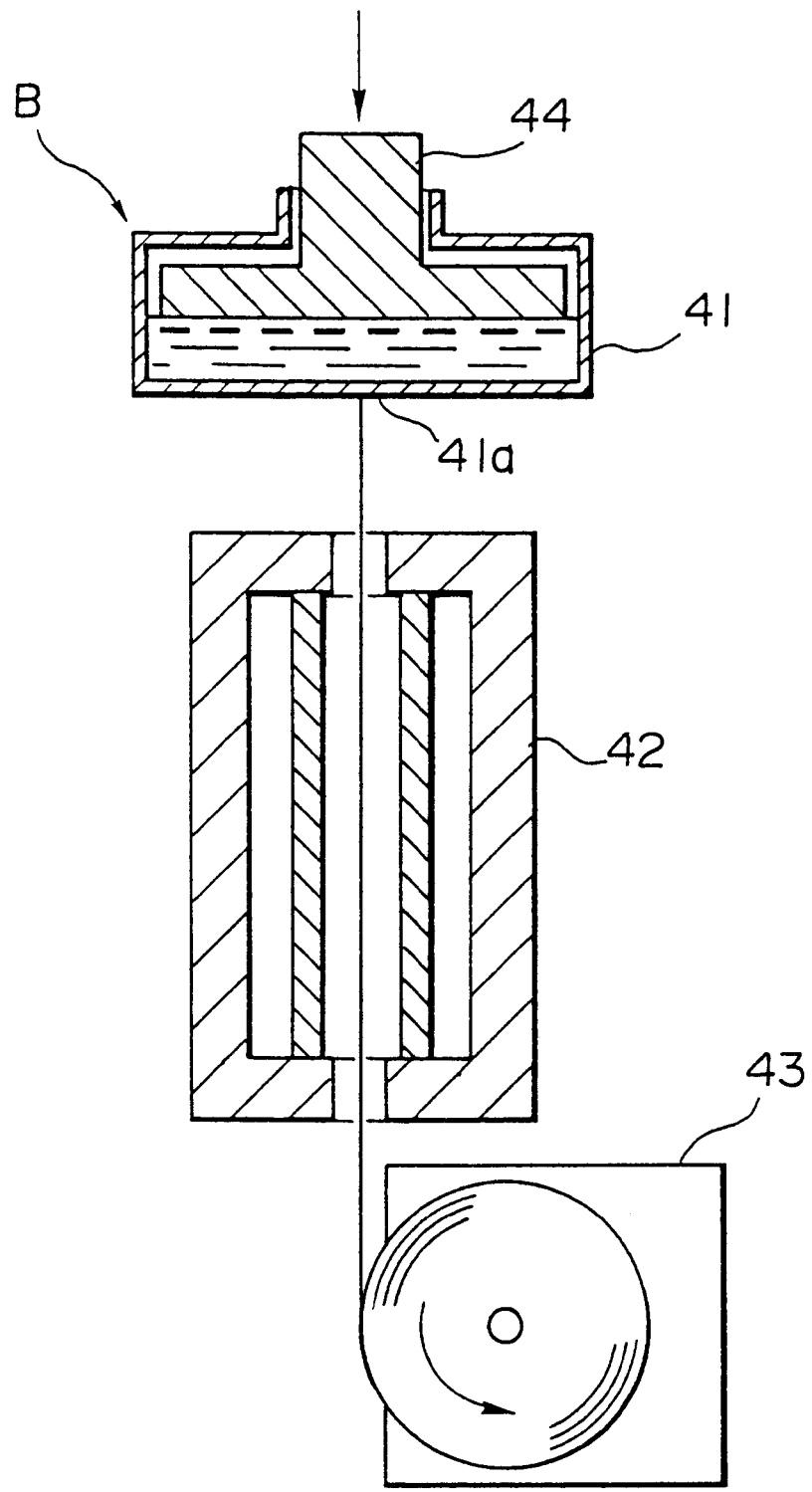
FIG. 2 is a model diagram illustrating the construction of a fiber forming apparatus B to be used in another embodiment of the method of this invention for the production of a fiber.

FIG. 2 is a structural diagram of a fiber forming device B which is different from the fiber forming device A described above. The fiber forming device B is mainly composed of a container 41 for the highly viscous sol solution which is provided in the bottom surface thereof with an opening 41a, a cylinder 44 for pressing the highly viscous sol, a heater unit 42 for heating the gel fiber which has been pressed by the cylinder 44 and extruded through the opening 41a, and a rewinding unit 43 for taking up the finished fiber. In this fiber forming device B, owing to the pressure applied by the cylinder 44 to the highly viscous sol solution stored in the container 41, the highly viscous sol solution is extruded out of the container through the opening 41a in the shape of a fiber and this fiber is passed through the heater unit 42 and finally taken up by the rewinding unit 43. The rewinding unit 43 is rotated at a fixed rate by a motor (not shown) and enabled to take up the fiber sequentially.

In the construction described above, the fiber freshly extruded out of the container 41 through the opening 41a is in the form of sol. As it is fallen down further, it is gradually converted into a gel fiber (fiber precursor) while emitting the solvent component therefrom by vaporization. This gel fiber, while in the heater unit 42, is crystallized by heating at a temperature enough for precipitating the metal oxide in a crystal phase to produce the fiber, e.g. a PLZT fiber possessed of an optoelectronic property aimed at. In the fiber forming device B according to the present preferred embodiment, the diameter of the fiber can be varied by varying the viscosity of the highly viscous sol, the speed of rotation of the rewinding unit 43, and the size of the opening 41a. For the purpose of producing the fiber of a prescribed diameter, it suffices to adjust suitably these operating factors.

In the fiber forming device B, the blend obtained by mixing a metal oxide powder such as, for example, a PLZT powder, with a small amount of a solvent such as an alcohol may be extruded in the place of the highly viscous sol to produce the fiber. By extruding the blend and then forming the extruded blend as described above, the fiber can be similarly produced by having the formed blend crystallized by heating with the heater.

By the fiber forming devices A and B described above, fibers having diameters in the range of 5–300 $\mu$m can be produced by suitably controlling various production conditions.

Instead of using the fiber forming device described above, the gel fiber may be completely formed at the third step and then subjected to a heat treatment at the fourth step. In this case, the gel fiber may be left standing in a tightly closed dry atmosphere and then subjected to the heat treatment mentioned above. Otherwise, by performing the heat treatment in the atmosphere of oxygen or in the atmosphere of steam, the duration of heating may be shortened or the duration of heat treatment may be cut.

By the method of production according to this invention, fibers of various metal oxides other than PLZT including the perovskite type structure metal oxides such as PZT, PbTiO$_3$, LiNbO$_3$, LiTaO$_3$, BiTiO$_3$, (Pb, Bi) (Zr, Ti)O$_3$, (Pb, Sr) (Zr, Ti)O$_3$, (Pb, La) (Hf, Ti)O$_3$, and Pb(W, Zr, Ti)O$_3$, metal oxides having PLZT as a basic component such as, for example, PBLZT having part of the lead of PLZT substituted with bismuth, PLLZT having part of lead substituted with lithium, (Pb, La) (Mg, Nb, Zr, Ti)O$_3$ having part of zirconium substituted with magnesium and niobium, or PLZT (Fe), and the tungsten bronze type structure metal oxide, such as (Pb, Ba, La)Nb$_2$O$_6$, (Pb, K)Nb$_2$O$_6$, or (Sr, Ba) Nb$_2$O$_6$ can be produced.

Optoelectronic Modulator

Next, the optoelectronic modulator according to this invention which makes use of the fiber possessed of an optoelectronic effect, among other fibers mentioned above, will be described below.

The optoelectronic modulator according to this invention does not need to utilize exclusively the fiber which is obtained by the method of production described above but may utilize a fiber which is obtained by some other method of production.

From the viewpoint of lack of purity and deficiency in homogeneity of fiber described above, however, it has been heretofore difficult to obtain a fiber of quality fit for commercial use at a low cost. Most appropriately, the optoelectronic modulator constructed as described herein below is formed of the fiber which is obtained by the method of production according to this invention.

The optoelectronic modulator of this invention is characterized by comprising a plurality of fibers possessed of an optoelectronic property, a retaining member for retaining the plurality of fibers substantially in parallel, and voltage applying means for applying an electric field to the plurality of fibers and altering the optoelectronic property thereof.

Specifically, the optoelectronic modulator of this invention which is constructed as described above can be applied to various devices such as, for example, optical shutters, display devices, light modulators, optical gates, and variable density filters which utilize the Kerr effect, image memories and display devices utilizing the light scattering effect, and optoelectronic modulators and spectral filters utilizing the primary optoelectronic effect.

The fibers to be used in the optoelectronic modulator of this invention are not particularly limited but are only required to be formed of a material having an optoelectronic property. As typical examples of the material which is usable for the fibers, PLZT, PZT, PBLZT, PLLZT, (Pb, La) (Mg, Nb, Zr, Ti)O$_3$, PbTiO$_3$, LiNbO$_3$, LiTaO$_3$, BiTiO$_3$, (Pb, Bi) (Zr, Ti)O$_3$, (Pb, Sr) (Zr, Ti)O$_3$, (Pb, La), (Hf, Ti)O$_3$, Pb(W, Zr, Ti)O$_3$, (Pb, Ba, La)Nb$_2$O$_6$, (Pb, K)Nb$_2$O$_6$, and (Sr, Ba)Nb$_2$O$_6$ may be cited, but not limited to.

The metal oxide fibers to be used in the optoelectronic modulator of this invention do not impose any particular limit on the method of production to be adopted as described above. They are preferred to be produced by spinning a highly viscous sol solution containing the relevant metal elements, or by extruding the highly viscous sol solution through proper orifices, or by extrusion forming a blend using a powder prepared by the so-gel method. They are particularly preferred to be produced by the method of production according to this invention described above. Most of the bulk materials of metal oxides heretofore used in the conventional optoelectronic modulators such as optical shutter array elements have been produced by mixing oxides and carbides of necessary component elements, subjecting the resultant mixtures to a pyrogenic reaction in the air, and sintering the produced powdery materials (hereinafter referred to as "solid-phase reaction"). Since the solid-phase reaction is such that the metal ions from the oxides and carbides of the component elements migrate past grain boundaries, the component elements are not homogeneously mixed to the molecular level and, even after the sintering, an impurity phase and heterogeneous portions tend to occur in the produced bulk. In contrast, the metal oxide fibers which have been synthesized by hydrolysis or polymerization from the sol state through the gel state are homogenized to the molecular level and, therefore, are in a state abounding in density and containing an impurity phase only sparingly as compared with the bulk which is synthesized by the solid-phase reaction. As a result, the Kerr effect on the ON-OFF application of voltage is affected only sparingly by aging and the operation of the optoelectronic modulator can be stably continued for a long time.

This invention uses the metal oxide possessed of an optoelectronic property in the form of fibers. These fibers have an amply large diameter. Thus, the optoelectronic modulator can be driven with a low voltage as compared with the element produced by the photolithography.

The fibers which are used in this invention do not impose any particular limit on the shape of exposing in a section. They are allowed to have various shapes of section such as, for example, a circle, an ellipse, a rectangle, a circle minus one arcuate part enclosed with an arc (minor arc) and a chord, and a circle minus two arcuate parts symmetrically positioned relative to one diameter, depending on the section of the array grooves formed on a substrate as described specifically herein below. The fibers having a circular section are manufactured most easily. They can be easily formed by the aforementioned operation of drawing or extruding fibers from the highly viscous sol or by the cast molding. The fibers having an elliptic section can be formed by provisionally forming fibers of a circular section by the operation of drawing or extruding fibers from the highly viscous sol or by the cast molding and then shaping the fibers as with rollers before they harden or by controlling the amount of the solvent to vaporize from the gel fibers during the drying thereof. The fibers having a rectangular section can be formed by provisionally forming fibers of a circular section by the operation of drawing or extruding fibers from the highly viscous sol or by the cast molding and then shaping the fibers as with rollers before they harden. The fibers having the section of a circle minus one or two arcuate parts can be formed by manufacturing fibers having a circular section and polishing the fibers in one tangential direction or in two substantially parallel tangential directions When the fibers have a section other than a circle, namely an ellipse, a rectangle, or a circle minus one or two arcuate parts, namely when they contain a substantially rectilinear portion in the circumferential line, specifically when the fibers contain a substantially planar face in the circumferential face along the axial line of fiber, they attain easy contact with the electrodes and prove advantageous in enabling the produced optoelectronic modulator to equalize the potential gradient. Particularly, the fibers having such sections as an ellipse, a rectangle, or a circle minus two arcuate parts are at an advantage in allowing the potential gradient to be equalized because they have two substantially planar opposed faces.

In the optoelectronic modulator of this invention, the retaining member mentioned above imposes no particular limit so long as it is capable of retaining a plurality of fibers substantially in parallel. It can be formed, for example, with a substrate which is adapted to mount the plurality of fibers thereon. It can be provided with a retaining plate which is capable of fixing from above the fibers mounted on the substrate as described above. For the purpose of enabling the modulator to be provided with fibers in high density, a plurality of substrates may be used and arrays of fibers disposed in two or more layers thereon or disposed two-dimensionally after the pattern of a matrix. When the arrays of fibers are disposed in two or more layers, the arrays in the superposed layers are preferred to be either staggered or deviated in phase so that the fibers in one array may not overlap those in another array in the vertical direction.

Otherwise, the retaining member may be formed solely of adhesive layers which intervene between the plurality of substantially parallel disposed fibers and serve to adjoin the adjacent fibers.

When the retaining member is formed of a substrate, this substrate is preferred to be provided in the surface part thereof with plurality of substantially parallel formed array grooves as suitably spaced from each other. This construction is at an advantage in allowing the plurality of fibers to be easily retained substantially in parallel.

The substrate mentioned above can be formed of a varying material. As typical examples of the material which can be used herein, silicon, glass, crystallized glass, ceramics, metals, and plastic substances may be cited, but not limited to. The silicon substrate is at an advantage in allowing the aforementioned construction of grooves to be easily manufactured by the etching technique. The glass substrate allows the construction of grooves to be manufactured easily by the glass molding technique. Particularly the glass having a low softening point, preferably a softening point below about 700° C., is at an advantage in allowing the construction of grooves to be manufactured with ease. The crystallized glass substrate is at an advantage in allowing the construction of grooves to be easily manufactured by the glass molding technique and enabling the substrate to acquire an increase in hardness or assume a controlled thermal expansion coefficient in consequence of crystallization. The ceramic substance is at an advantage in enjoying selection of a hard material such as, for example, alumina or zirconia. The metal substrate is at an advantage in being easily formed in an expected shape by machining. It can be formed of aluminum, for example.

The array grooves to be formed on the substrate do not need to impose any particular limit on the shape of section thereof. Although they are allowed to have a varying section, they are preferred to have such a section as a triangle, a semicircle, a rectangle, or a trapezoid which allows the fibers to be easily fixed in position. Such sections as triangles and semicircles can be formed by anisotropic etching of silicon, molding of glass, or injection molding of plastic, such sections as rectangles by anisotropic etching of silicon, molding of glass, or injection molding or cutting of plastic, and such sections as trapezoids by molding of glass or injection molding of plastic, for example.

In the optoelectronic modulator according to this invention, the voltage applying means can be composed of a common electrode (otherwise called "secondary electrode" hereinafter) collectively contacting all the plurality of fibers disposed on the surface of the substrate as the retaining member, discrete electrodes (otherwise called "primary electrodes" hereinafter) disposed at the surface positions other than the positions of contact of the individual fibers with the common electrode, and a drive voltage power source for applying a voltage between the common electrode and the discrete electrodes.

The common electrode and the discrete electrodes can be formed by using either singly or as suitably combined such reflecting metal materials as Al, such light-intercepting materials as Au and Cr, such transparent electrode materials as ITO (indium oxide-tin oxide) and NESA (tin oxide-antimony oxide), metal pastes such as silver paste, conductive resins obtained by dispersing metals in resin, and frits containing such metal components as Ag-Pd, depending on the question whether the element is produced in a transparent type or in a reflecting type. The formation of these electrodes with such metal materials as Al and Au or with such transparent electrode materials as ITO or NESA can be attained, for example, by the combination of the technique of photolithography with the vacuum film-forming technique such as vacuum deposition or sputtering, the combination of the technique of photolithography with the sol-gel technique, or the combination of the screen printing of a sol-gel solution with a heat treatment or with the lift-off technique. The formation of the electrodes with metal pastes or with conductive resins can be attained by using the technique of screen printing and the formation of the electrodes with frits can be attained by the technique of screen printing and the subsequent heat treatment.

It is further permissible to form the electrodes by superposing electrode materials of different types such as, for example, the combination of such transparent electrode materials as ITO with such reflecting type metal materials as Al. The optical properties such as refractive index and reflectivity can be adjusted by suitably superposing such materials of different types.

The discrete electrodes can be formed by using an isotropic conducting sheets. The anisotropic conducting sheet is a metal dispersed resin tape manifesting anisotropy in terms of the direction of electric conduction. Generally, such anisotropic conducting sheets are used as lead lines for discrete electrodes in liquid crystal material devices. When such an anisotropic conducting sheet is pasted to a substrate and a plurality of fibers are arrayed in conformity with the direction of conduction of the sheet, the electric conduction is obtained in the longitudinal direction of the fibers and not obtained in the lateral direction, namely between the individual fibers. Since in this construction the fibers are not required to be severally provided with voltage applying elements but may be collectively provided with one common voltage applying element, therefore, the formation of the discrete electrodes can be easily formed.

When such a device as, for example, an optical shutter is formed by the use of the optoelectronic modulator of this invention, it becomes necessary to provide with the optoelectronic modulator with a polarized light. The formation of this polarized light, for example, is attained by a method utilizing deflecting plates or a method utilizing a metal-superposed waveguide. Where the deflecting plates are utilized, it suffices to attach or simply dispose these deflecting plates on the inlet side and the outlet side of the element relative to the direction of the incident light in the manner of cross-nicol polarization such that the directions of transmission of the polarized lights of the deflecting plates may be rotated by 90 degrees. Where the metal laminated, waveguide is utilized, it suffices to construct the element so that a waveguide provided with a metal film, for example, the waveguide obtained by forming an Al film on a silica waveguide, may inject a light into the fibers or the fibers may be covered with a metal film. The metal film formed on the waveguide can take the place of the deflecting plate because it is capable of forming a polarized light.

The optoelectronic modulator of this invention requires a plurality of fibers possessed of an optoelectronic property to be arrayed substantially in parallel. This substantially parallel arrangement of the fibers may be facilitated possibly by a method which comprises forming grooves or holes in the substrate and inserting the fibers in the grooves or holes, a method which comprises preparatorily scribing guide lines on the substrate and then arranging the fibers along the guide lines, or a method which comprises winding fibers as spaced at a fixed pitch on the barrel of a drum of a large diameter, applying an adhesive agent to the surface of barrel so as to fill in the gaps between the fibers arrayed on the barrel with the adhesive agent, solidifying the adhesive agent filling the gaps between the fibers so as to form a composite in the shape of tape, cutting the resultant composite in a prescribed size, polishing the upper and the lower side of the cut piece to expose the fibers in the upper and the lower side, and attaching the electrodes to the exposed portions of fibers. In the last method, since the cut piece has an extremely small size as compared with the diameter of the drum, the radius of curvature of this cut piece can be substantially disregarded.

As respects the manufacture of the optoelectronic modulator of the present invention, the quantity production of the devices of high quality by the in-line operation can be realized by subjecting the permeated light measured on some sections of fibers to image processing by the use of a polarizing microscope and inspecting the images to detect defects with foreign particles.

Now, the optoelectronic modulator of this invention will be described below with reference to specific modes of embodiment.

Figure 3:
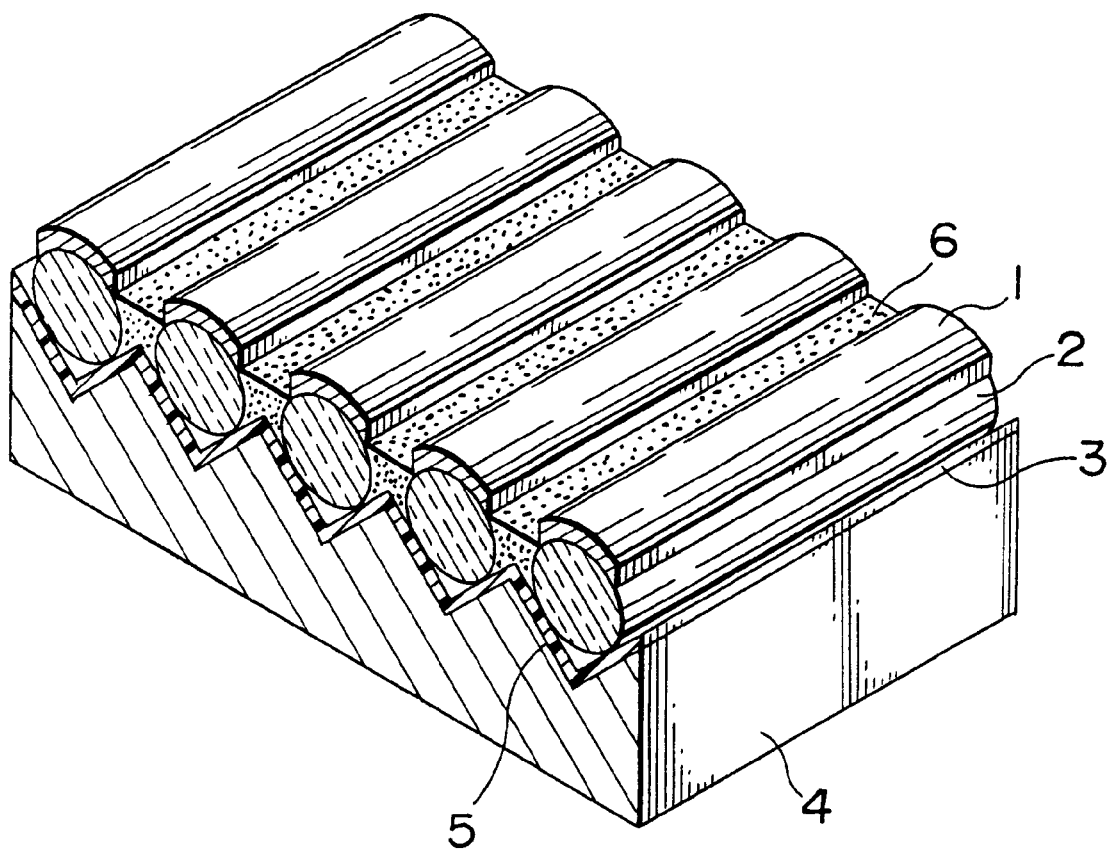
FIG. 3 is a perspective view illustrated in a model the construction of an optical shutter array element D1 as the first embodiment of the optoelectronic modulator of this invention.

FIG. 3 is a perspective view illustrating the construction of an optical shutter array element D1 as the first embodiment of the optoelectronic modulator of this invention.

This optical shutter array element D1 is mainly composed of first electrodes 1, PLZT fibers 2, second electrodes 3, and a substrate 4.

The substrate 4 is a flat plate made of alumina and has a plurality of parallel V grooves 5 formed on one side of the flat plate. A frit containing Ag-Pd is applied as a conducting adhesive agent to the V grooves 5. This frit forms the second electrodes 3 and, at the same time, fixes the PLZT fibers 2 in position. The term "frit" as used herein refers to glass powder which is molten by a heat treatment and, when subsequently cooled, is enabled to serve as an adhesive agent. On the PLZT fibers 2, Al electrodes are severally formed as first discrete electrodes 1 by vacuum deposition. Further, the gaps between the adjacent PLZT fibers 2 are filled with a packing agent 6 of black polyethylene resin. This packing agent 6 is used for the purpose of mutually shielding the PLZT fibers 2 from light.

For the production of the optical shutter array element D1 of this embodiment, first the PLZT fibers 2 are produced by the method of production according to the present invention described above.

In the production of the PLZT fibers, first a sol solution containing the elements, Pb, La, Zr, and Ti in a prescribed ratio is prepared. The solvent to be used in the preparation of the sol solution is preferred to be an alcohol-based solvent having a boiling point of not lower than 70° C. as mentioned above. Then, this sol solution is heated or concentrated under a decreased pressure to expel part of the solvent by vaporization or, by further addition of an acid catalyst, the metal material in the sol solution is polymerized and converted into a complex, with the result that a highly viscous sol having the viscosity exalted to the level of manifesting spinnability is obtained. As pointed out previously, the temperature of this heating is preferred to be not higher than 100° C. and the addition of a catalyst is preferred to be avoided. From this highly viscous sol, the fiber having a diameter in the approximate range of 5 to 300 μm is produced in the manner already described by the use of a fiber forming device A illustrated in FIG. 1 or a fiber forming device B illustrated in FIG. 2, for example.

In the meanwhile, the substrate 4 made of alumina and provided on the surface thereof with the plurality of mutually parallel V grooves 5 is prepared. The V grooves 5 may be formed by subjecting a flat plate of alumina to a cutting work with a cutting tool such as a diamond cutter. Otherwise, they may be integrally formed by manufacturing an alumina substrate by the use of a die which is possessed of inverted V ridges matching the V grooves 5. The substrate 4 may be made of other material than alumina on the condition that this material be possessed of prescribed rigidity. When the optoelectronic modulator is intended as an optical shutter array element, the substrate 4 is preferred to be made of an opaque material to prevent leakage of light between the fibers.

Figure 4A:
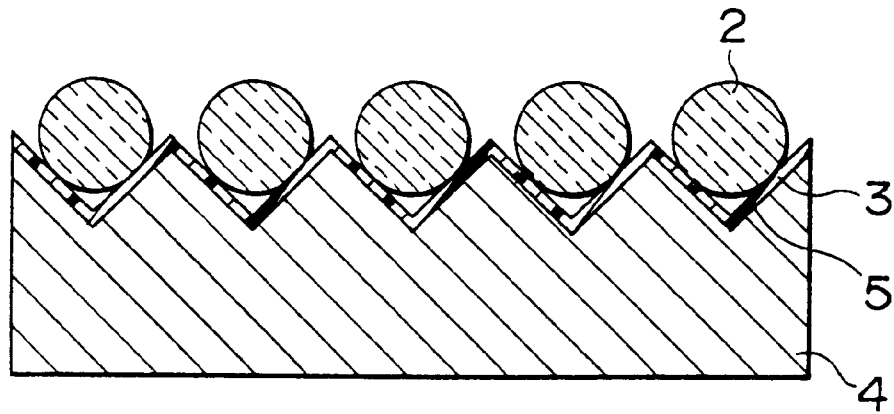
FIGS. 4A–4C are model diagrams illustrating steps of a process for the production of the optical shutter array element D1 illustrated in FIG. 3.

Then, an electroconducting adhesive agent obtained by mixing Ag-Pd with a grit is applied on the V grooves 5 to for the second electrodes 3. The POZT fibers 2 produced as described above are mounted one each on the grooves, heated, and then cooled to attach the PLZT fibers 2 to the relevant V grooves 5. The process just described is depicted in FIG. 4A by way of a model. Since the PLZT fibers 2 are attached through the medium of the Ag-Pd electrodes (second electrodes 3) incorporating the frit therein as described above, they can be easily fixed in a state infallibly allowing application of a voltage. As this electroconducting adhesive agent, a conducting resin material may be used.

Since the substrate 4 is possessed of the V grooves 5, the PLZT fibers 2 can be easily fixed in position. The optical shutter array element which uses such PLZT fibers as are produced by the conventional mechanical machining or chemical etching requires the PLZT fibers in the light passing part to be worked with high accuracy. In the construction of the present embodiment, the positioning can be attained relatively easily with high accuracy even when the diameters of the PLZT gibers 2 and the positions of the V grooves 5 are not very accurate.

Figure 4B:
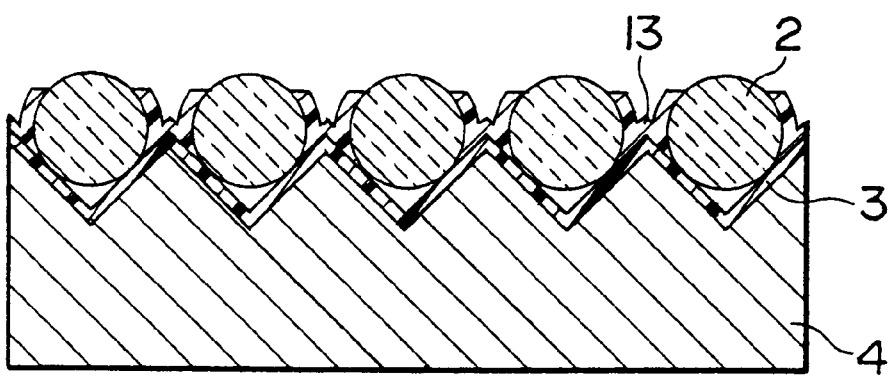

Than, the end faces of the PLZT fibers 2 are cut and aligned as with a diamond cutter and optically polished. An ultraviolet curing resin 13 is applied thinly to the entire surface of the fibers except the upper side thereof and the applied layer of the resin on the fibers is exposed to the ultraviolet light to fix the PLZT fibers 2 perfectly to the substrate. The ensuing state of the fibers fixed on the substrate is depicted in FIG. 4B.

Figure 4C:
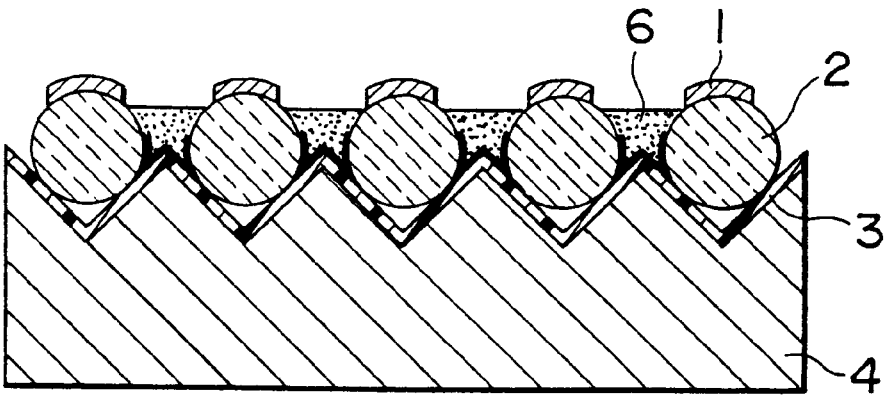

Finally, the PLZT fibers 2 excepting the upper side thereof to which the ultraviolet curing resin 13 has not been applied are masked by photolithography and are sputtered to have Al deposited on the upper side of each of the PLZT fibers 2 to give rise to the first electrodes of Al. Into the gaps which are formed between the PLZT fibers 2 when the ultraviolet curing resin 13 has been cured and shrunken, the packing agent 6 made of polyethylene resin is injected to shield the PLZT fibers individually against light. The ensuing state of the PLZT fibers is depicted with a model in FIG. 4C. The first electrodes 1 may be made of a material other than Al on the condition that the material should excel in fastness of adhesion to the PLZT and in electroconductivity. The packing agent 6 may be made of a material other than polyethylene resin. Any material which, when cured, shrinks so much as to exert stress on the PLZT fibers 2 is unfit for the packing agent 6. Further, the material for the packing agent 6 is preferred to have a lower refractive index than PLZT to preclude leakage of light and manifest transparency. The order in which the step of filling the gaps with the packing agent 6 and the step of forming the first electrodes 1 by sputtering are carried out does not matter.

Figure 5:
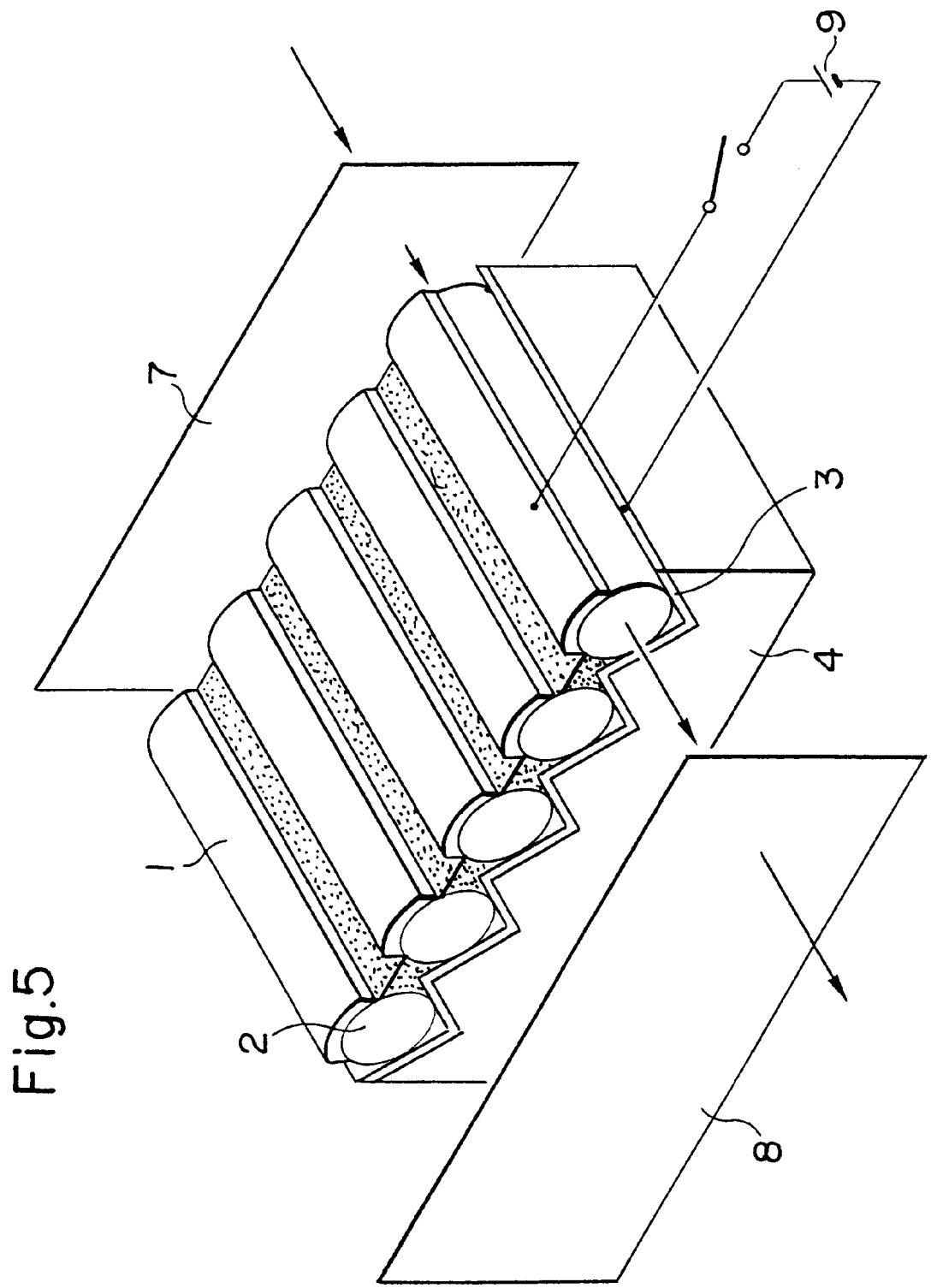
FIG. 5 is a perspective view illustrating in a model the state of use of the optical shutter array element D1 illustrated in FIG. 3.

FIG. 5 is a model diagram illustrating one example of the construction of the optical shutter using the optical shutter array element D1 shown in FIG. 3.

In FIG. 5, a polarizer 7 and an optoanalyzer 8 are severally disposed at the opposite end sides of the PLZT fibers 2 of the optical shutter array element D1 and a power source 9 applies a prescribed drive voltage between the first electrodes 1 and the second electrodes 3. The PLZT fibers 2 are each provided with a drive circuit (not shown) of a fixed construction. Since the drive voltage can be applied independently to the PLZT fibers 2, the light which enters each of the fibers can be independently modulated. The light to be modulated enters the optical shutter array element D1 on the polarizer 7 side and departs therefrom on the optoanalyzer 8 side. The polarizer 7 and the optoanalyzer 8 have well-known constructions which exclusively allow passage of the light in a specific polarizing direction.

The principle of the modulation which is effected by the optical shutter array element D1 constructed as described above will be explained briefly. The PLZT has the nature of generating birefringence in proportion to the magnitude of drive voltage applied by the Kerr effect. By virtue of this nature, the state of polarization of the incident light can be varied in numerous ways by suitably controlling the drive voltage applied to each of the PLZT fibers 2. Since the transmittance of the optoanalyzer 8 is varied proportionately to the variation of the state of polarization, the beams of light emanating from optoanalyzer 8 have intensities modulated severally for the individual fibers.

Figure 6:
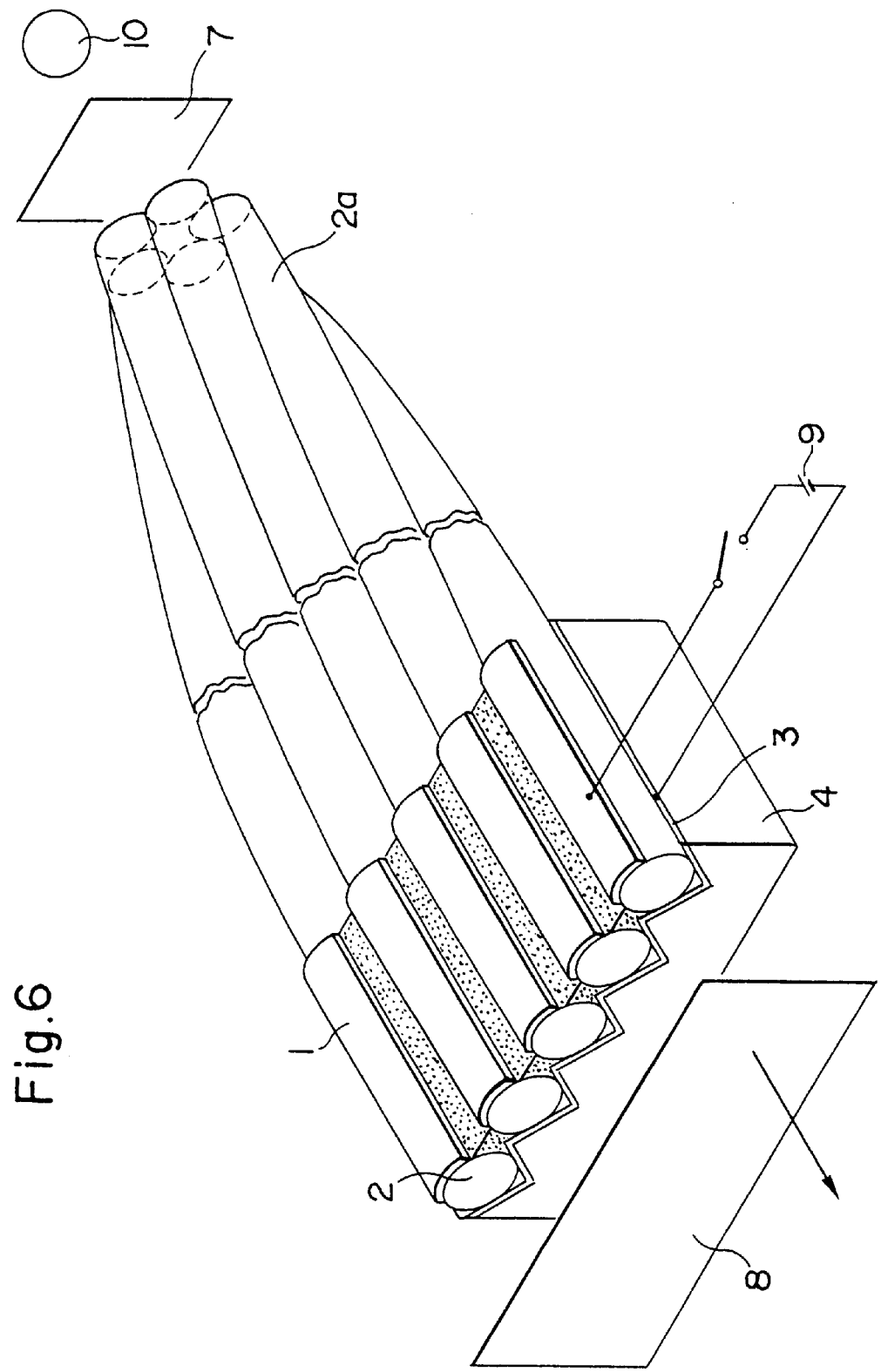
FIG. 6 is a perspective view illustrating in a model the construction of an optical shutter array element D2 as the second embodiment of the optoelectronic modulator of this invention.

FIG. 6 is a perspective view illustrating the construction of an optical shutter array element D2 as the second embodiment of this invention. Since the construction of the optical shutter array element D2 as the second embodiment is roughly identical with that of the optical shutter array element D1 mentioned above, the only components thereof which differ from their equivalent components of the latter element D1 will be explained below. The optical shutter array element D2 of the second embodiment has the PLZT fibers 2 extended on the polarizer 7 side and the end parts 2a of the extended fibers bundled. Near the end parts 2a, a light source 10 is disposed through the medium of the polarizer 7. In the optical shutter array element D2 which is constructed as described above, the light emitted from the light source 10 passes the polarizer 7, then enters the PLZT fiber 2 via the end part 2a, and released as modulated in the same manner as in the first embodiment. This construction improves the efficiency of the utilization of the light source 10 and allows production of an optical modulating unit in a compact and simple design. Specifically, by extending the end parts of the fibers on one side in one same direction and then bundling the extended end parts thereby collecting the light receiving parts of the plurality of fibers into one bundle as described above, the light which is generally emitted from one unitary optoelectronic modulator can be utilized with enhanced efficiency. Further, the fact that the fibers are extended from the substantial region of the optical shutter array element in which the electrodes are disposed brings about such freedom of design as enables the light source and other similar components to be positioned with a fair amount of arbitrariness.

Figure 7:
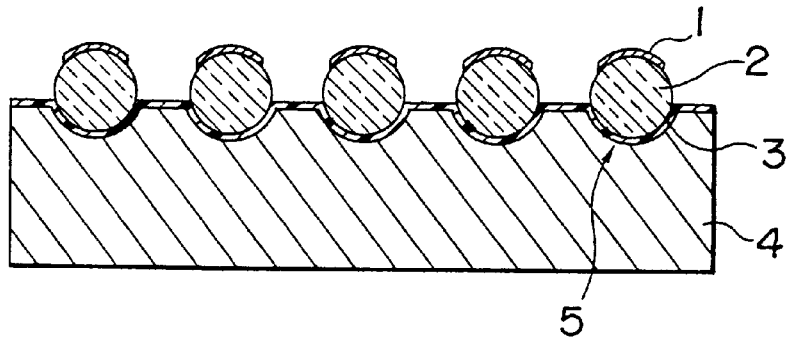
FIG. 7 is a sectional view illustrating in a model the construction of an optical shutter array element D3 as the third embodiment of the optoelectronic modulator of this invention.

FIG. 7 is a sectional view illustrating the construction of an optical shutter array element D3 as the third embodiment of this invention. The construction of the optical shutter array element D3 as the third embodiment is roughly identical with the optical shutter array element D1 shown in FIG. 3 and is different therefrom only in respect that the plurality of mutually parallel grooves 5 formed on one side of the flat substrate 4 have a semicircular section instead of the V-shaped section.

The fact that the grooves 5 formed in the substrate 4 have a semicircular section as described above enables the fibers 2 having a circular section to be easily fixed in place on the substrate 4.

Figure 8:
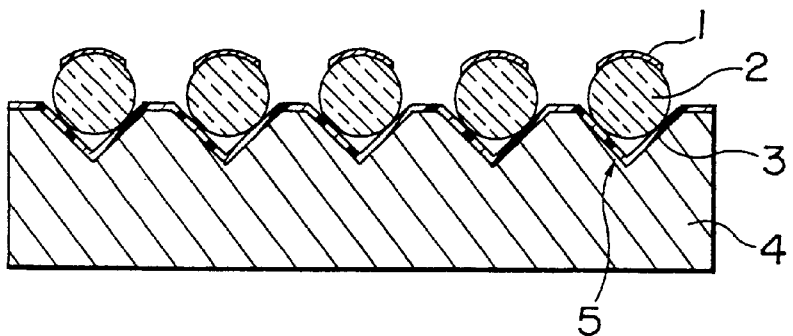
FIG. 8 is a sectional view illustrating in a model the construction of an optical shutter array element D4 as the fourth embodiment of the optoelectronic modulator of this invention.

FIG. 8 is a sectional view illustrating the construction of an optical shutter array element D4 as the fourth embodiment of this invention. The construction of the optical shutter array element D4 as the fourth embodiment is roughly identical with that of the optical shutter array element D1 shown in FIG. 3 and different therefrom only in respect that the second electrodes 3 formed in the V grooves 5 are formed of a film of vacuum deposited metal in the place of the conducting frit. In this optical shutter array element of this embodiment, the electric continuity between the fibers 2 and the second electrodes 3 is accomplished solely in the parts of contact between the fibers 2 and the V grooves 5.

Figure 9:
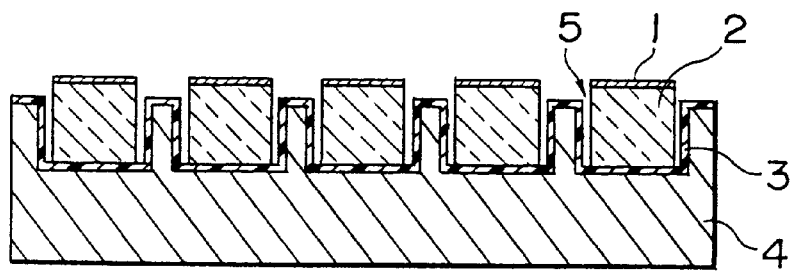
FIG. 9 is a sectional view illustrating in a model the construction of an optical shutter array element D5 as the fifth embodiment of the optoelectronic modulator of this invention.

FIG. 9 is a sectional view illustrating the construction of an optical shutter array element D5 as the fifth embodiment of this invention. The construction of the optical shutter array element D5 as the fifth embodiment is roughly identical with that of the optical shutter array element D1 shown in FIG. 3 and different therefrom only in respect that the plurality of mutually parallel grooves 5 formed on one side of the flat substrate 4 have a rectangular section instead of the V-shaped section and that the fibers 2 similarly have a rectangular section.

The fact that the grooves 5 formed in the substrate 4 have a rectangular section as described above allows the fibers 2 to be easily fixed in position on the substrate 4. Further, since the fibers likewise have a rectangular section, the second electrodes 3 which contact the lower side of the fibers 2 and the first electrodes 1 which contact the upper side of the fibers 2 are allowed to assume planar shapes and are easily formed and they jointly enable the produced optical shutter array element to have their potential gradient equalized.

Figure 10:
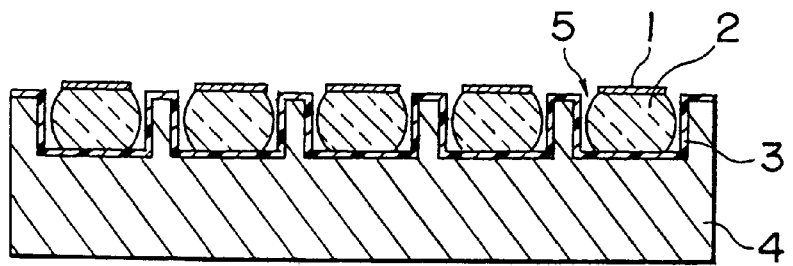
FIG. 10 is a sectional view illustrating in a model the construction of an optical shutter array element D6 as the sixth embodiment of the optoelectronic modulator of this invention.

FIG. 10 is a sectional view illustrating the construction of an optical shutter array element D6 as the sixth embodiment of this invention. The construction of the optical shutter array element D6 as the sixth embodiment is roughly identical with that of the optical shutter array element D5 shown in FIG. 9 and different therefrom only in respect that the fibers 2 have an elliptic section.

When the fibers 2 have an elliptic section as described above, the second electrodes 3 which contact the lower side of the fibers 2 and the first electrodes 1 which contact the upper side of the fibers 2 are allowed to assume substantially planar shapes and are easily formed and they jointly enable the produced optical shutter array element to have their potential gradient equalized.

Figure 11:
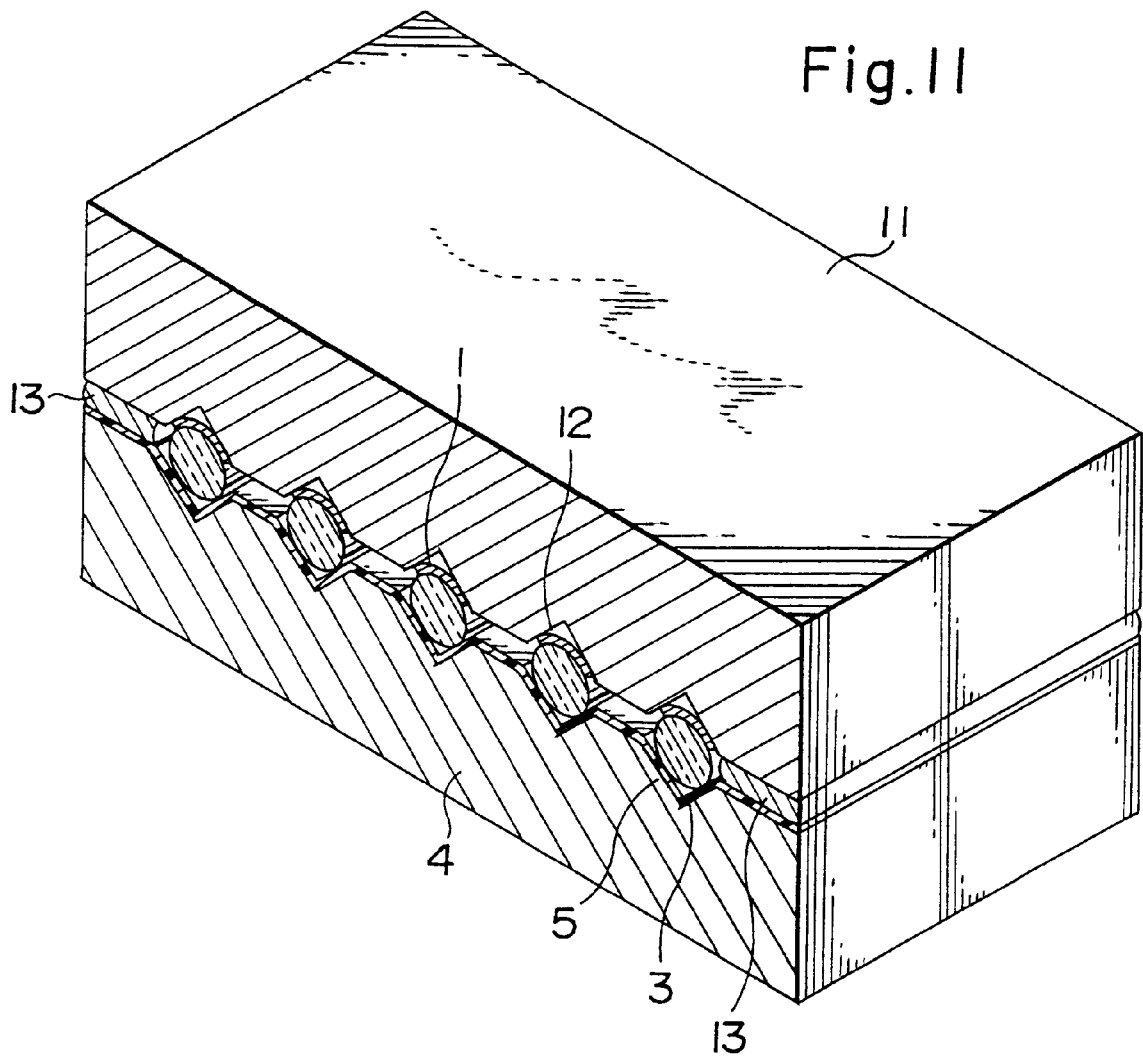
FIG. 11 is a perspective view illustrating in a model the construction of an optical shutter array element D7 as the seventh embodiment of the optoelectronic modulator of this invention.

FIG. 11 is a perspective view illustrating an optical shutter array element D7 as the seventh embodiment of this invention. This optical shutter array element D7 is similar to the optical shutter array element D1 shown in FIG. 3 in comprising a substrate 4 containing V grooves 5, PLZT fibers 2, a first electrode 1 formed of an Al electrode, and a second electrode 3 formed of an Au-Pd electrode. It is further provided on the PLZT fibers 2 a fiber retaining plate 11 which has such a structure as is obtained by inverting the substrate 4 and which is provided on the lower side thereof with V grooves 12. The V grooves 12 of this retaining plate 11 severally admit the upper sides of the PLZT fibers 2. The substrate 4 and the retaining plate 11 are joined to each other in the opposite lateral side parts thereof with an ultraviolet curing resin 13. This construction is at an advantage in enabling the optical shutter array element D7 to be manufactured easily and preventing the PLZT fibers from being adversely affected by the adhesive agent because the PLZT fibers can be immobilized by using the adhesive agent only in the lateral side parts offering no seat for the PLZT fibers without requiring use of the adhesive agent in the central part of the substrate 4 which seats the PLZT fibers.

Figure 12:
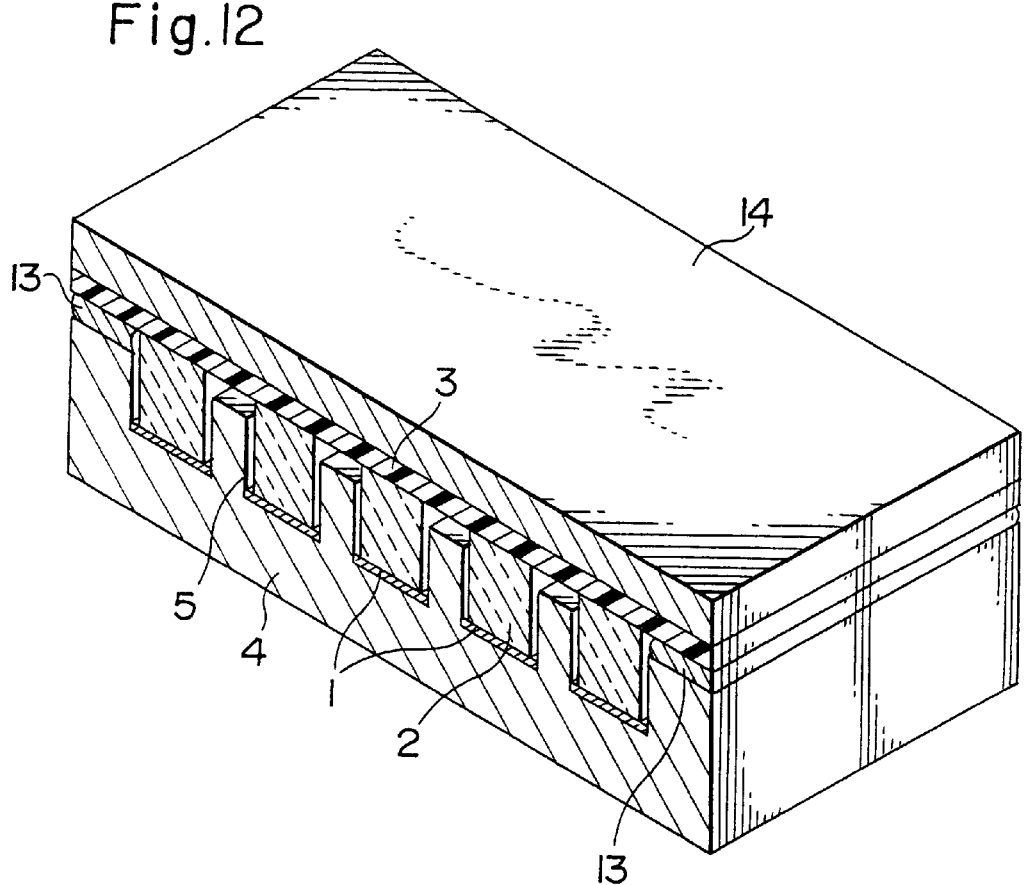
FIG. 12 is a perspective view illustrating in a model the construction of an optical shutter array element D8 as the eighth embodiment of the optoelectronic modulator of this invention.

FIG. 12 is a perspective view illustrating the construction of an optical shutter array element D8 as the eighth embodiment of this invention. This optical shutter array element D8 is similar to the optical shutter array element D5 as the fifth embodiment shown in FIG. 9 in comprising a substrate 4 containing V grooves 5, PLZT fibers 2 having a rectangular section, a first electrode 1 formed of an Al electrode, and a second electrode 3 formed of an Au-Pd electrode. It is further provided on the PLZT fibers 2 with a planar fiber retaining plate 14. The substrate 4 and the retaining plate 14 are joined to each other in the opposite lateral side parts thereof with an ultraviolet curing resin 13. This optical shutter array element D8 as the eighth embodiment is similar to the optical shutter array element D7 as the seventh embodiment in producing the advantage of facilitating the manufacture of the element and preventing the PLZT fibers from being adversely affected by the adhesive agent.

Figure 13:
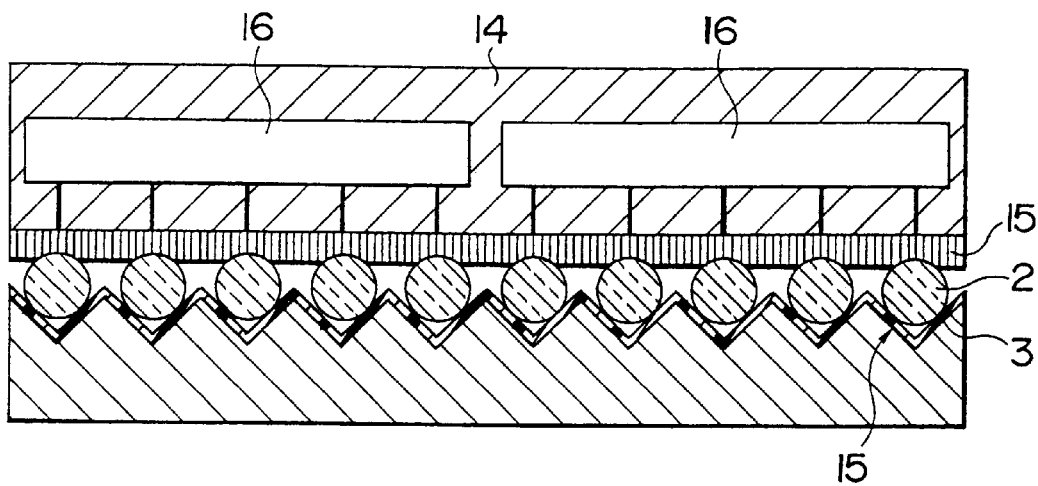
FIG. 13 is a sectional view illustrating in a model the construction of an optical shutter array element D9 as the ninth embodiment of the optoelectronic modulator of this invention.

FIG. 13 is a sectional view illustrating the construction of an optical shutter array element D9 as the ninth embodiment of this invention. This optical shutter array element D9 is similar to the optical shutter array element D1 shown in FIG. 3 in being provided with a substrate 4 containing V grooves 5, PLZT fibers 2, and a second electrode 3 formed of an Au-Pd electrode. It is further provided on the PLZT fibers 2 with one anisotropic conducting sheet 15 in the place of the first electrode 1 formed of a plurality of Al electrodes formed one each for the optical fibers 2. It is provided further on this anisotropic conducting sheet 15 with a fiber retaining plate 14 incorporating therein a voltage applying element 16 adapted to establish electric continuity to the anisotropic conducting sheet 15. This fiber retaining plate 14 serves the purpose of immobilizing the PLZT fibers 2. This anisotropic conducting sheet 15 establishes electric continuity through the fibers 2 in the longitudinal direction thereof and not in the lateral direction thereof, i.e. not across the boundaries of the fibers 2. Thus, the discrete electrodes can be easily formed because the application of voltage to the individual fibers can be attained by simply installing one common voltage applying element instead of providing the fibers 2 severally with voltage applying elements.

Figure 14:
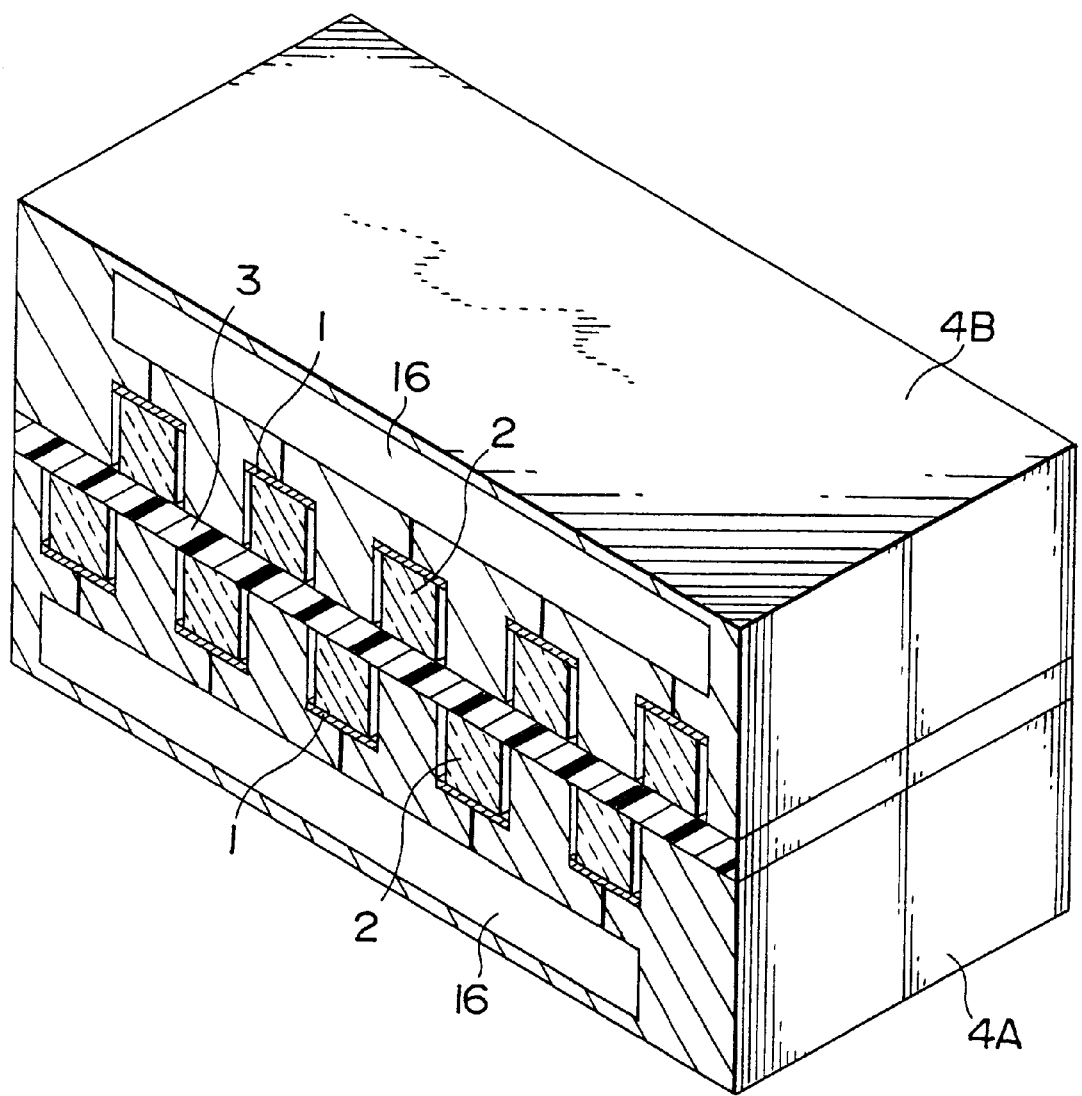
FIG. 14 is a perspective view illustrating in a model the construction of an optical shutter array element D10 as the tenth embodiment of the optoelectronic modulator of this invention.

FIG. 14 is a perspective view illustrating the construction of an optical shutter array element D10 as the tenth embodiment of this invention. In this optical shutter array element D10, two rows of PLZT fibers 2 are disposed one each on and beneath the second electrode 3, a common electrode disposed along the central part of the element. The PLZT fibers 2 are fixed in place as accommodated into the grooves 5 formed in the first substrate 4A on the lower side and in the second substrate 4B on the upper side. These fibers 2 are disposed in a staggered manner so as not to overlap in the vertical direction. The first electrodes 1 as discrete electrodes for the individual fibers 2 are formed on the bottom faces of the grooves 5. These first electrodes 1 are further adapted to establish electric continuity to voltage applying elements 16 incorporated one each in the substrates 4A and 4B. The installation of the groups of PLZT fibers in a multiplicity of stages allows further miniaturization of the element.

Figure 15:
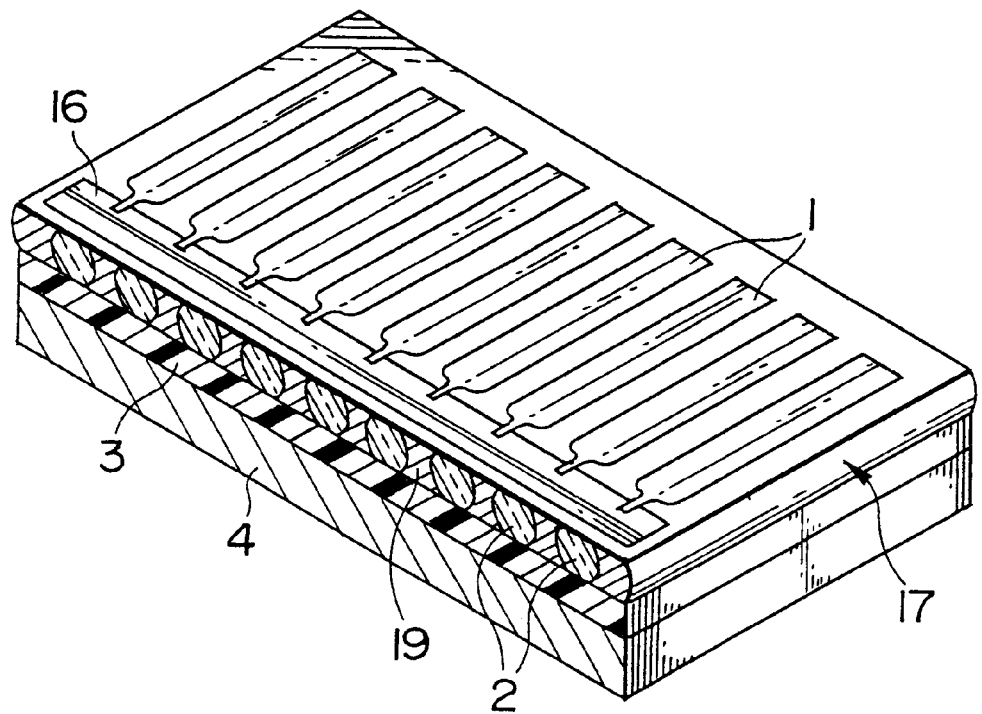
FIG. 15 is a perspective view illustrating in a model the construction of an optical shutter array element D11 as the eleventh embodiment of the optoelectronic modulator of this invention.

FIG. 15 is a perspective view illustrating the construction of an optical shutter array element D11 as the eleventh embodiment of this invention. In this element D11, a second electrode 3 is formed on a planar substrate 4 throughout the entire area thereof. On this second electrode 3, a fiber unit 17 of the shape of a tape having a plurality of PLZT fibers 2 separated at a fixed pitch ad fixed in position with an adhesive agent is mounted. First discrete electrodes 1 are formed one each on the upper side of the fibers 2 and are adapted to establish electric continuity to the voltage applying elements 16.

Figure 17A:
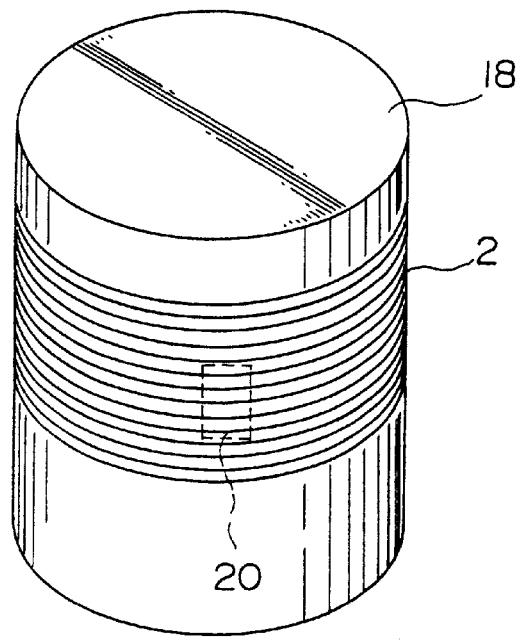
FIGS. 17A–17C are model diagram illustrating steps of a process for the production of a fiber unit to be used in the optical shutter array element D11 illustrated in FIG. 15.
Figure 17B:
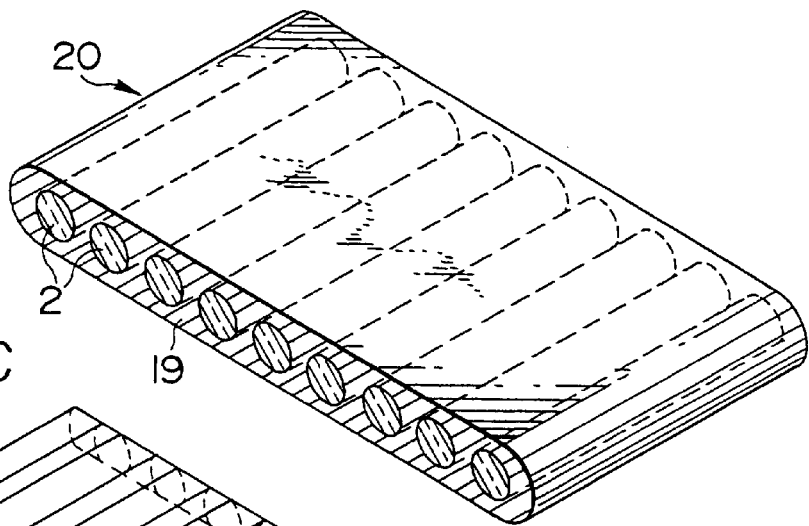
Figure 17C:
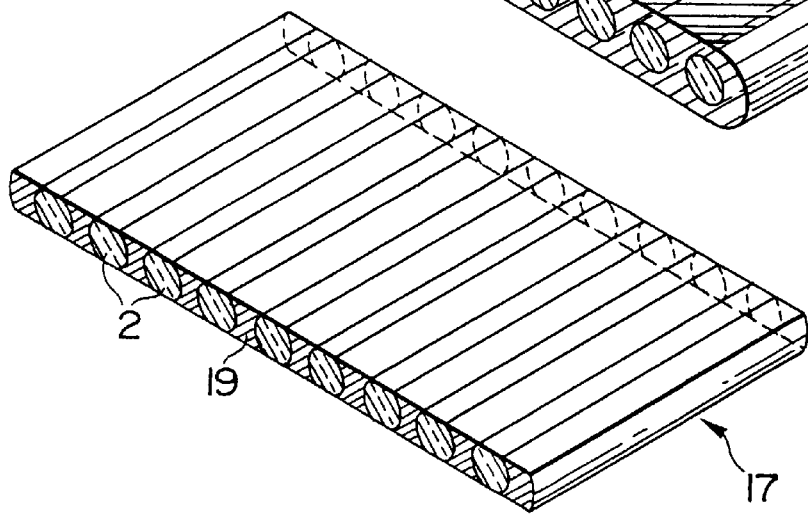

The fiber unit 17 which is used in this optical shutter array element D1 can be manufactured as illustrated in FIGS. 17A–17C, gor example. First, as shown in FIG. 17A, PLZT fibers 2 are wound on the barrel of a drum 18 of an amply large diameter as spaced at a fixed pitch and the gaps between the fibers are hardened with an adhesive agent. The PLZT fibers thus immobilized with the adhesive agent are cut into pieces of a prescribed size to obtain a cut piece 20 having PLZT fibers 2 immobilized as spaced mutually with an adhesive agent layer 19 as shown in FIG. 17B. This cut piece 20 has the upper and lower aside thereof partially polished to obtain a fiber unit 17 which has the fibers exposed in the upper and lower sides as shown in FIG. 17C.

By using the fiber unit 17 which has the PLZT fibers 2 assembled as a unit as spaced with a fixed pitch, the element can be easily obtained in an expected construction without providing the substrate 4 with grooves necessary for the arrangement of fibers. Thus, the fiber unit 17 proves highly advantageous for the manufacture of the element.

Figure 16:
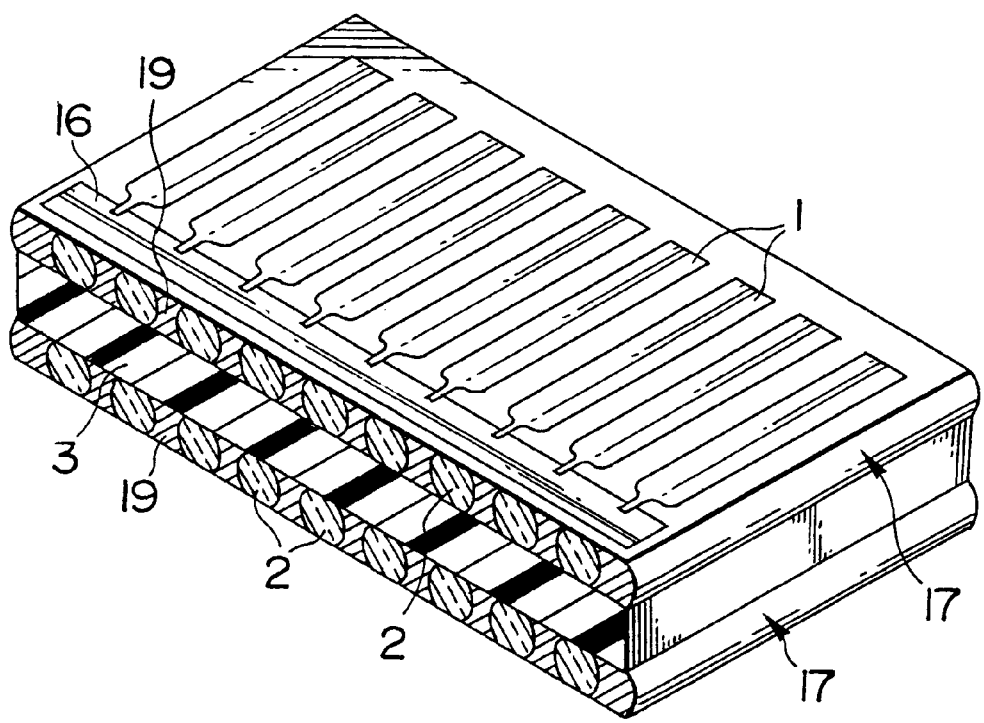
FIG. 16 is a perspective view illustrating in a model the construction of an optical shutter array element D12 as the twelfth embodiment of the optoelectronic modulator of this invention.

FIG. 16 is a perspective view illustrating the construction of an optical shutter array element D12 as the twelfth embodiment of this invention. This element D12 is constructed by using fiber units 17 resembling the fiber unit used in the element D11 as the eleventh embodiment of this invention. Specifically, two fiber units 17 are disposed one each on the beneath the second electrode 3, a common electrode disposed along the central part of the element. The individual fibers 1 in the fiber units 17 are disposed in a staggered pattern so as not to overlap in the vertical direction within the element. The first discrete electrodes 1 are formed on the exposed parts of the individual fibers 2 on the side of the fiber unit 17 opposite the side thereof held in contact with the second electrode 3. These discrete electrode 1 are adapted to establish electric continuity to a voltage applying element 16. Although FIG. 16 illustrates only the first electrodes 1 and the voltage applying element 16 which are formed on the upper side of the fiber unit 17 disposed on the upper side, the first electrodes 1 and the voltage applying element 16 are similarly disposed on the lower side of the fiber unit 17 which is installed on the lower side.

The optical shutter array elements of the embodiments described above are characterized by forming fibers of a metal oxide possessed of an optoelectronic property and applying these metal oxide fibers to an optical shutter array element. The conventional optical shutter array elements using a metal oxide invariably have such a metal oxide as PLZT fabricated by metal working or chemical etching and, therefore, are at a disadvantage in attaining miniaturization only with difficulty, necessitating fabrication of high accuracy, and proving expensive. In contrast thereto, in the optical shutter array elements of these embodiments, the PLZT arrays of a required accuracy can be produced simply and very compactly in a highly integrated construction by forming the fibers in a varied diameter as arranged with a varied pitch.

The optical shutter array elements of the embodiments described above have been depicted as using PLZT fibers by way of example. The material for the fibers is only required to be possessed of such an optoelectronic property as mentioned above. By using the fibers made of a material other than PLZT, the same element as described above can be formed.

Now, this invention will be described more specifically below with reference to working examples. It should be noted, however, that the examples cited herein below are aimed solely at facilitating the comprehension of this invention and are not meant to impose any limit on this invention.

Preliminary Experiment 1

Solutions of the compositions shown in Tables 1 to 8 were prepared experimentally for the production of PLZT fibers. The results of the experiment are additionally shown in the same tables in the brackets titled "Result".

The method of experiment covered in Table 1 and Table 2 is shown below. In 2-methoxyethanol having a boiling point of about 124° C. (produced by Nakaraitesuku K. K.), lanthanum propoxide ($La(OPr^i)_3$, produced by Kojundokagaku K. K.) was heated at 70° C. and stirred until solution. The resultant solution was gradually cooled. The cooled solution and lead acetate trihydride ($Pb(OAc)_2 \cdot 3H_2O$, produced by Nakaraitesuku K. K.) added thereto were together heated at 70° C. and stirred while attentively avoiding vaporization of the water of crystallization to produce Solution A. Meanwhile, Solution B was prepared by mixing ethanol having a boiling point of 78° C. (EtOH, produced by Nakaraitesuku K. K.) with zirconium propoxide (75.6% $Zr(OPr)_4$+PrOH, produced by Nippon Soda Co., Ltd.) and titanium isopropoxide ($Ti(OPr^i)_4$, produced by Wako Pure Chemical Industries, Ltd.) until homogenization at room temperature (25° C.±1° C.). As respects Solution A and Solution B, the dropwise addition of Solution B to Solution A (Table 1) and the dropwise addition of Solution A to Solution B (Table 2) were investigated to determine whether or not they produced a homogeneous solution containing no suspended precipitate. The temperature of Solution A was kept at about 70° C. during the dropwise addition. As shown in Table 1, when Solution B was dropwise added to Solution A, a precipitate slightly occurred, though in a smaller amount than when the water of crystallization was removed. This slight precipitation is logically explained by supposing that when the amount of ethanol was less than 2 in molar ratio, zirconium propoxide and titanium isopropoxide underwent a vigorous hydrolytic polymerization reaction and consequently gave rise to the precipitate No precipitate occurred when the amount of ethanol was larger than 2 in molar ratio In contrast, when Solution A was added dropwise to Solution B, no precipitate occurred even when the addition of ethanol was omitted as shown in Table 2.

TABLE 1

| | PLZT Sol (Solution B is drop-fed ino solution A) (Molar ratio) | | | | | | | | | |
|---|---|---|---|---|---|---|---|---|---|---|
| | Solution A | | | Solution B | | | | | | |
| No. | 2-Methoxyethanol | $Pb(OAc)_2 \cdot 3H_2O$ | $La(Opr^1)_3$ | $Ti(Opr^i)_4$ | $Zr(OPr)_4$ | PrOH | EtOH | EtOH | $H_2O$ | Result |
| 1 | 6.000 | 1.001 | 0.090 | 0.342 | 0.635 | 1.117 | 0.000 | 10.000 | 2.000 | Slightly precipitated |
| 2 | 6.000 | 1.001 | 0.090 | 0.342 | 0.635 | 1.117 | 1.000 | 10.000 | 2.000 | Slightly |

TABLE 1-continued

PLZT Sol (Solution B is drop-fed ino solution A) (Molar ratio)

| | Solution A | | | Solution B | | | | | | |
|---|---|---|---|---|---|---|---|---|---|---|
| No. | 2-Methoxyethanol | Pb(OAc)$_2$.3H$_2$O | La(Opr$^i$)$_3$ | Ti(Opr$^i$)$_4$ | Zr(OPr)$_4$ | PrOH | EtOH | EtOH | H$_2$O | Result |
| 3 | 6,000 | 1.001 | 0.090 | 0.342 | 0.635 | 1.117 | 2.000 | 10.000 | 2.000 | precipitated Slightly precipitated |
| 4 | 6.000 | 1.001 | 0.090 | 0.342 | 0.635 | 1.117 | 2.500 | 10.000 | 2.000 | Transparent sol |
| 5 | 6.000 | 1.001 | 0.090 | 0.342 | 0.635 | 1.117 | 3.000 | 10.000 | 2.000 | Transparent sol |
| 6 | 6.000 | 1.001 | 0.090 | 0.342 | 0.635 | 1.117 | 10.000 | 10.000 | 2.000 | Transparent sol |

TABLE 2

PLZT Sol (Solution A is drop-fed into solution B) (Molar ratio)

| | Solution A | | | Solution B | | | | | | |
|---|---|---|---|---|---|---|---|---|---|---|
| No. | 2-Methoxyethanol | Pb(OAc)$_2$.3H$_2$O | La(Opr$^i$)$_3$ | Ti(Opr$^i$)$_4$ | Zr(OPr)$_4$ | PrOH | EtOH | EtOH | H$_2$O | Result |
| 7 | 6.000 | 1.001 | 0.090 | 0.342 | 0.635 | 1.117 | 0.000 | 10.000 | 2.000 | Transparent sol |
| 8 | 6.000 | 1.001 | 0.090 | 0.342 | 0.635 | 1.117 | 1.000 | 10.000 | 2.000 | Transparent sol |
| 9 | 6.000 | 1.001 | 0.090 | 0.342 | 0.635 | 1.117 | 2.000 | 10.000 | 2.000 | Transparent sol |
| 10 | 6.000 | 1.001 | 0.090 | 0.342 | 0.635 | 1.117 | 10.000 | 10.000 | 2.000 | Transparent sol |

Then, in the experiments covered in Tables 3 to 8, solutions were prepared by following the procedure of the experiment covered in Table 2 while changing the solvent and the additives thereto in kind. As a result, clear sol solutions were obtained in all the compositions as shown in the relevant tables.

In the tables, the acronyms representing the following compounds are used: MEA: monoethanol amine (produced by Nakaraitesuku K. K.), DEAD diethanol amine (produced by Nakaraitesuku K. K.), and EDTA: ethylene diamine tetraacetic acid (produced by Nakaraitesuku K. K.).

TABLE 3

PLZT Sol (Raw material of La is changed. Solution A is drop-fed into solution B) (Molar ratio)

| | Solution A | | | Solution B | | | | | | |
|---|---|---|---|---|---|---|---|---|---|---|
| No. | 2-Methoxyethanol | Pb(OAc)$_2$.3H$_2$O | La(Oac)$_3$.1.5H$_2$O | Ti(Opr$^i$)$_4$ | Zr(OPr)$_4$ | PrOH | EtOH | EtOH | H$_2$O | Result |
| 11 | 12.000 | 1.001 | 0.090 | 0.342 | 0.635 | 1.117 | 10.000 | 10.000 | 2.000 | Transparent sol |

TABLE 4

PLZT Sol (Raw material of Zn is changed. Solution A is drop-fed into solution B) (Molar ratio)

| | Solution A | | | Solution B | | | | | | |
|---|---|---|---|---|---|---|---|---|---|---|
| No. | 2-Methoxyethanol | Pb(OAc)$_2$.3H$_2$O | La(Opr$^i$)$_3$ | Ti(Opr$^i$)$_4$ | Zr(Obt)$_4$ | BtOH | EtOH | 2-Methoxyethanol | H$_2$O | Result |
| 12 | 10.000 | 1.001 | 0.090 | 0.342 | 0.635 | 0.365 | 10.000 | 10.000 | 2.000 | Transparent sol |

TABLE 5

PLZT Sol (Solvent of Solution A is changed. Solution A is drop-fed into solution B) (Molar ratio)

| | Solution A | | | | Solution B | | | | | | |
|---|---|---|---|---|---|---|---|---|---|---|---|
| No. | PrOH | MEA | Pb(OAc)$_2$.3H$_2$O | La(Opr$^i$)$_3$ | Ti(Opr$^i$)$_4$ | Zr(OPr)$_4$ | PrOH | EtOH | EtOH | H$_2$O | Result |
| 13 | 10.000 | 2.000 | 1.001 | 0.090 | 0.342 | 0.635 | 1.117 | 10.000 | 10.000 | 2.000 | Transparent sol |
| 14 | 30.000 | 0.000 | 1.001 | 0.090 | 0.342 | 0.635 | 1.117 | 10.000 | 10.000 | 2.000 | Transparent sol |

TABLE 6

PLZT Sol (Solvent of Solution A is changed. Solution A is drop-fed into solution B) (Molar ratio)

| | Solution A | | | | Solution B | | | | | | |
|---|---|---|---|---|---|---|---|---|---|---|---|
| No. | PrOH | DEA | Pb(OAc)$_2$.3H$_2$O | La(Opr$^i$)$_3$ | Ti(Opr$^i$)$_4$ | Zr(OPr)$_4$ | PrOH | EtOH | EtOH | H$_2$O | Result |
| 15 | 10.000 | 2.000 | 1.001 | 0.090 | 0.342 | 0.635 | 1.117 | 10.000 | 10.000 | 2.000 | Transparent sol |

TABLE 7

PLZT Sol (Solvent of Solution A is changed. Solution A is drop-fed into solution B) (Molar ratio)

| | Solution A | | | | Solution B | | | | | | |
|---|---|---|---|---|---|---|---|---|---|---|---|
| No. | PrOH | EDTA | Pb(OAc)$_2$.3H$_2$O | La(Opr$^i$)$_3$ | Ti(Opr$^i$)$_4$ | Zr(OPr)$_4$ | PrOH | EtOH | EtOH | H$_2$O | Result |
| 16 | 10.000 | 2.000 | 1.001 | 0.090 | 0.342 | 0.635 | 1.117 | 10.000 | 10.000 | 2.000 | Transparent sol |

TABLE 8

PLZT Sol (Solvent of Solution A is changed. Solution A is drop-fed into solution B) (Molar ratio)

| | Solution A | | | | Solution B | | | | | | |
|---|---|---|---|---|---|---|---|---|---|---|---|
| No. | BtOH | MEA | Pb(OAc)$_2$.3H$_2$O | La(Opr$^i$)$_3$ | Ti(Opr$^i$)$_4$ | Zr(OPr)$_4$ | PrOH | EtOH | EtOH | H$_2$O | Result |
| 17 | 10.000 | 2.000 | 1.001 | 0.090 | 0.342 | 0.635 | 1.117 | 10.000 | 10.000 | 2.000 | Transparent sol |
| 18 | 30.000 | 0.000 | 1.001 | 0.090 | 0.342 | 0.635 | 1.117 | 10.000 | 10.000 | 2.000 | Transparent sol |

When the compositions of clear sols obtained in the experiments described above were concentrated by means of a rotary evaporator, they gave rise to highly viscous sols manifesting spinnability.

The above experiments was repeated except the both temperature conditions of using at the solution of lanthanum and lead material and at the addition of the solutions were set at 90° C., a temperature (not higher than 100° C.) not enough to induce removal of the water of crystallization. When compared the results of this set of experiments with those of the former set, regarding the tendency of precipitation occurrence, no discernible difference was observed in whole compositions mentioned above.

Preliminary Experiment 2

Solutions of the compositions shown in Tables 9 and 10 were prepared experimentally for the production of PZT fibers. The results of the experiment are additionally shown in the same tables in the brackets titled "Result".

The experiment was carried out as follows. First, Solution D was prepared by adding lead acetate trihydride to 2-methoxyethanol and heating at 70° C. and stirring them together until solution while attentively avoiding vaporization of the water of crystallization. Then, Solution E was prepared by mixing ethanol with zirconium propoxide and titanium isopropoxide at room temperature (25° C.±1° C.) and homogenizing them together by stirring. As respects Solution D and Solution E, the dropwise addition of Solution E to Solution D (Table 9) and the dropwise addition of Solution D to Solution E (Table 10) were investigated to determine whether or not they produced a homogeneous solution containing no suspended precipitate. The temperature of Solution D was kept at about 70° C. during the dropwise addition. As shown in Table 9, when Solution E was dropwise added to Solution D, as in the case of the PLZT sol solution in Preliminary Experiment 1 mentioned above, a precipitate was slightly produced so long as the amount of ethanol was not more than 2 in molar ratio probably by a vigorous hydrolysis polymerization reaction between zirconium propoxide and titanium isopropoxide. No precipitate was produced when the amount of ethanol was larger than 2 in molar ratio. In contrast when Solution D was added dropwise to Solution E, no precipitate occurred even when the addition of ethanol was omitted.

until solution. The hot solution was left cooling. Solution A was obtained by adding lead acetate trihydride to the cooled solution and heating them together at 70° C. until solution. Separately, Solution B was obtained by adding titanium isopropoxide and zirconium propoxide sequentially in the order mentioned to ethanol of one half of its total supply in molar ratio and then mixing them together. Solution A was

TABLE 9

PZT Sol (Solution E is drop-fed into solution D) (Molar ratio)

| | Solution D | | Solution E | | | | | | |
|---|---|---|---|---|---|---|---|---|---|
| No. | 2-Methoxyethanol | Pb(OAc)$_2$.3H$_2$O | Ti(OPr$^i$)$_4$ | Zr(OPr)$_4$ | PrOH | EtOH | EtOH | H$_2$O | Result |
| 19 | 6.000 | 1.001 | 0.500 | 0.500 | 0.880 | 0.000 | 10.000 | 2.000 | Slightly precipitated |
| 20 | 6.000 | 1.001 | 0.500 | 0.500 | 0.880 | 2.000 | 10.000 | 2.000 | Slightly precipitated |
| 21 | 6.000 | 1.001 | 0.500 | 0.500 | 0.880 | 2.500 | 10.000 | 2.000 | Transparent sol |
| 22 | 6.000 | 1.001 | 0.500 | 0.500 | 0.880 | 10.000 | 10.000 | 2.000 | Transparent sol |

TABLE 10

PZT Sol (Solution D is drop-fed into solution E) (Molar ratio)

| | Solution D | | Solution E | | | | | | |
|---|---|---|---|---|---|---|---|---|---|
| No. | 2-Methoxyethanol | Pb(OAc)$_2$.3H$_2$O | Ti(OPr$^i$)$_4$ | Zr(OPr)$_4$ | PrOH | EtOH | EtOH | H$_2$O | Result |
| 23 | 6.000 | 1.001 | 0.500 | 0.500 | 0.880 | 0.000 | 10.000 | 2.000 | Transparent sol |
| 24 | 6.000 | 1.001 | 0.500 | 0.500 | 0.880 | 2.000 | 10.000 | 2.000 | Transparent sol |
| 25 | 6.000 | 1.001 | 0.500 | 0.500 | 0.880 | 2.500 | 10.000 | 2.000 | Transparent sol |
| 26 | 6.000 | 1.001 | 0.500 | 0.500 | 0.880 | 10.000 | 10.000 | 2.000 | Transparent sol |

When the compositions of clear sols obtained in the experiments described above were concentrated by means of a rotary evaporator, they gave rise to highly viscous sols manifesting spinnability.

The above experiments was repeated except the both temperature conditions of using at the solution of lanthanum and lead material and at the addition of the solutions were set at 90° C., a temperature (not higher than 100° C.) not enough to induce removal of the water of crystallization. When compared the results of this set of experiments with those of the former set, regarding the tendency of precipitation occurrence, no discernible difference was observed in whole compositions mentioned above.

EXAMPLE 1

Example 1 constitutes an example of the application of the method of this invention to the production of PLZT fibers. As a typical example of the Preliminary Experiment 1 mentioned above, the composition identified as No. 10 in Table 2 was used for the production of fibers.

First step

First, a sol solution containing 2-methoxyethanol, lead acetate trihydride, lanthanum isopropoxide, zirconium propoxide, titanium isopropoxide, ethanol, and water at a molar ratio of 6:1.001:0.09:0.635:0.342:20:2 was prepared by the following procedure.

First, lanthanum isopropoxide was added to 2-methoxyethanol and they were together heated to 90° C.

placed in Solution B and they were together mixed. The resultant mixed solution was refluxed at 78° C. for two hours and then left cooling to room temperature (25° C.±1° C.). Further, a mixed solvent formed of the remainder of ethanol with water was added dropwise to the cooled mixed solution and they were stirred to produce a homogeneous sol solution which was labeled as Solution C.

Second step

Solution C was left standing for two hours and then thermally concentrated at a temperature closely approximating to the boiling point of 2-methoxyethanol until it showed spinnability to give rise to a highly viscous sol.

Third step

A pin of a sharp point was dipped in the highly viscous sol obtained in the second step and then pulled up. When the thread of the sol dragged by the pin was pulled up at a rate of 80 cm/second with a fiber forming device A constructed as shown in FIG. 1, a gel fiber was produced.

Fourth step

The gel fiber was heat-treated at 700° C. for 15 minutes as enveloped with the air in an electric furnace as a heater unit 32 in the fiber forming device A. As a result, this gel fiber was crystallized into a homogeneous and dense crystalline structure without sustaining any crack. The crystalline structure, when analyzed by X-ray diffraction, was found to form a perovskite phase and consequently identified to be a PLZT fiber. This fiber was found to have a diameter of 30 μm.

EXAMPLE 2

A fiber was produced by following the procedure of Example 1 while changing the speed of pulling at the third step to 120 cm/second. As a result, a fiber, 5 µm in diameter, could be obtained after the heat treatment of the fourth step. It was found by X-ray diffraction analysis to be a PLZT fiber possessing a perovskite phase.

EXAMPLE 3

A fiber was produced by following the procedure of Example 1 while changing the speed of pulling at the third step to 50 cm/second. As a result, a fiber, 300 µm in diameter, could be obtained after the heat treatment of the fourth step. It was found by X-ray diffraction analysis to be a PLZT fiber possessing a perovskite phase.

EXAMPLE 4

Example 4 constitutes an example of the application of the method of this invention to the production of PZT fibers. As a typical example of the Preliminary Experiment 2 mentioned above, the composition identified as No. 26 in Table 10 was used for the production of fibers.

First step

First, a sol solution containing 2-methoxyethanol, lead acetate trihydride, titanium isopropoxide, zirconium propoxide, ethanol, and water at a molar ratio of 6:1.001:0.5:0.5:20:2 was prepared by the following procedure.

First, lead acetate trihydride was added to 2-methoxyethanol and they were together heated to 70° C. until solution to obtain Solution D. Separately, Solution E was obtained by adding titanium isopropoxide and zirconium propoxide sequentially in the order mentioned to ethanol of one half of its total supply in molar ratio and mixing them together. Solution D was placed in Solution E and they were together mixed. The resultant mixed solution was refluxed at 78° C. for two hours and then left cooling to room temperature 25° C.±1° C.) Further, a mixed solvent formed of the remainder of ethanol with water was added dropwise to the cooled mixed solution and they were stirred to produce a homogeneous sol solution which was labeled as Solution F.

Second step

Solution F was left standing for two hours and then thermally concentrated at a temperature closely approximating to the boiling point of 2-methoxyethanol until it showed spinnability to give rise to a highly viscous sol.

Third step

A pin of a sharp point was dipped in the highly viscous sol obtained in the second step and then pulled up. When the thread of the sol dragged by the pin was pulled up at a rate of 80 cm/second with a fiber forming device A constructed as shown in FIG. 1, a gel fiber was produced.

Fourth step

The gel fiber was heat-treated at 700° C. for 15 minutes as enveloped with the air in an electric furnace as a heater unit 32 in the fiber forming device A. As a result, this gel fiber was crystallized into a homogeneous and dense crystalline structure without sustaining any crack. The crystalline structure, when analyzed by X-ray diffraction, was found to form a perovskite phase and consequently identified to be a PZT fiber. This fiber was found to have a diameter of 30 µm.

EXAMPLE 5

Example 5 constitutes an example of the application of the method of this invention to the production of $Pb(Ni_{1/3}Nb_{2/3})O_3$ fibers.

First step

First, a sol solution containing 2-methoxyethanol, lead acetate trihydride, nickel acetyl acetonate dihydride $((CH_3COCHCOCH_3)_2Ni \cdot 2H_2O$, produced by Wako Pure Chemical Industries, Ltd.), niobium ethoxide $(Nb(OEt)_5$, produced by Kojundokagaku K. K.) ethanol, and water at a molar ratio of 24:3.003:1:2:60:6 was prepared by the following procedure.

First, lead acetate trihydride was added to 2-methoxyethanol of one half of its total supply and they were together heated to 70° C. until solution and nickel acetyl acetonate dihydride was dissolved therein at the same temperature to obtain Solution G. Then, Solution H was obtained by adding niobium ethoxide to the remainder of 2-methoxyethanol and ethanol of one half of its total supply and mixing them together Solution G was placed in Solution H and they were together mixed. The resultant mixed solution was refluxed at 78° C. for two hours and then left cooling to room temperature (25°±5° C.) Further, a mixed solvent formed of the remainder of ethanol with water was added dropwise to the cooled mixed solution and they were stirred to produce a homogeneous sol solution which was labeled as Solution I.

Second step

Solution I was left standing for two hours and then thermally concentrated at a temperature closely approximating to the boiling point of 2-methoxyethanol until it showed spinnability to give rise to a highly viscous sol.

Third step

A pin of a sharp point was dipped in the highly viscous sol obtained in the second step and then pulled up. When the thread of the sol dragged by the pin was pulled up at a rate of 80 cm/second with a fiber forming device A constructed as shown in FIG. 1, a gel fiber was produced.

Fourth step

The gel fiber was heat-treated at 700° C. for 15 minutes as enveloped with the air in an electric furnace as a heater unit 32 in the fiber forming device A. As a result, this gel fiber was crystallized into a homogeneous and dense crystalline structure without sustaining any crack. The crystalline structure, when analyzed by X-ray diffraction, was found to form a perovskite phase and consequently identified to be a $Pb(Ni_{1/3}Nb_{2/3})O_3$ fiber. This fiber was found to have a diameter of 30 µm.

EXAMPLE 6

An optical shutter array element was produced by using the PLZT fiber, 30 µm in diameter, manufactured in Example 1 and composed of Pb, La, Zr, and Ti at a molar ratio of 1001:90:635:342.

The optical shutter array element thus produced had the construction of the element D1 shown in FIG. 3 above.

As the substrate for the element, the used is a substrate of alumina measuring 1 mm in length, 40 mm in width, and 0.5 mm in thickness and provided on the surface thereof 1000 of mutually parallel V grooves as spaced at a pitch of 40 µm and formed by a cutting work with a diamond cutter.

By the way, in the modes of other than fiber, the length of element is at most 100 µm or so. The upper limit of the length is due to mechanical strength of element. On the contrary, in the mode of fiber, the length can be planned as, for example, 1 mm as shown in this example, or further as up to 2–5 mm. Since in the mode of fiber the length in longitudinal direction can be enlarged as indicated above, the lengths of electrodes 1 and 3 in the longitudinal direction also can be enlarged. Thereby, the voltage to be required for shuttering can be lowered, then an inexpensive drive source may be only adapted to.

An electroconducting adhesive agent obtained by mixing Ag-Pd with frit was applied as a common electrode to the V grooves of the alumina substrate. The PLZT fibers obtained in Example 1 were mounted one each on the V grooves, heated, and then cooled to fix the PLZT fibers to the V grooves.

Then, the end faces of the PLZT fibers were cut and aligned as with a diamond cutter and optically polished. An ultraviolet curing resin was applied thinly to the entire surface of the fibers except the upper side thereof and the applied layer of the resin on the fibers was exposed to the ultraviolet light to fix the PLZT fibers 2 perfectly to the substrate.

Finally, the PLZT fibers excepting the upper side thereof to which the ultraviolet curing resin had not been applied were masked by photolithography and were sputtered to have 500–5000 Å of Al film deposited on the upper side of each of the PLZT fibers to give rise to Al electrodes as discrete electrodes. Into the gaps which were formed between the PLZT fibers when the ultraviolet curing resin had been cured and shrunken, a packing agent made of polyethylene resin was injected to shield the PLZT fibers individually against light.

The optical shutter array element thus manufacture was laid out as shown in FIG. 4 and a voltage of 4.2 V was severally applied to the fibers and a laser beam was injected into the fibers. It was consequently confirmed that an ample difference existed between the laser beams emanating from the fibers to which the drive voltage had been applied and those emanating from the fibers to which no drive voltage had boon applied. When this element was used as a printer head for writing an image on a sensitive material, the printer head produced a resolution equivalent to 600 dpi.

While the method for production of a fiber and the optoelectronic modulator according to this invention have been described with reference to preferred embodiments of the invention, it is to be distinctly understood for person skilled in this art that the invention is not limited thereto but can be otherwise variously embodied and practiced without departing from the spirit and scope of this invention only as limited by the following claims.

The entire disclosures of Japanese Patent Application No. 08-160,826 filed on Jun. 28, 1996, Japanese Patent Application No. 00-168,827 filed on Jun. 28, 1996, and Japanese Patent Appication 09-170560 filed on Jun. 26, 1997, including the specification, claims, drawings and summary are incorporated herein by reference in its entirety.

What is claimed is:

1. A method for the production of a fiber, comprising a first step of dispersing a raw material containing at least one of a metal hydrate and a hydrated metal compound in an alcohol-based solvent having a boiling point of not lower than 70° C. thereby preparing a sol solution, a second step of heating said sol solution obtained in said first step at a temperature of not higher than 100° C. thereby polymerizing said raw material and effecting conversion thereof to a complex and subsequently concentrating said complex until it manifests spinnability, a third step of stretching said sol solution obtained at the end of said second step into a fiber precursor thereby effecting gelation thereof, and a fourth step of heating said gelatinized fiber precursor thereby producing a fiber.

2. A method according to claim 1, wherein one of an unidentate ligand and an multidentate ligand capable of forming a metal complex with said alcohol-based solvent is used additionally in said first step.

3. A method according to claim 2, wherein one of said unidentate ligand and said multidentate ligand forming said metal complex is an amine-based ligand.

4. A method according to claim 1, wherein neither an acid catalyst nor a basic catalyst is used in said second step.

5. A method according to claim 1, wherein said raw material has a composition containing at least one element selected from Pb, La, and Bi and at least one element selected from Zr, Ti, Ni, Nb, Fe, and W as metal components.

6. A method according to claim 1, wherein said raw material has a composition containing at least one element of Pb and La and at least one element of Zr and Ti as metal components.

7. A method according to claim 1, wherein said raw material has a composition containing Pb and at least one element of Zr and Ti as metal components.

8. A method according to claim 1, wherein one of said hydrated metal compound and other metal compound contained in said raw material is at least one compound selected from the group consisting of alkoxides, acetates, and acetyl acetonates of metals.

9. A method according to claim 1, wherein said alcohol-based solvent is one member selected from the group consisting of ethanol, n-propanol, isopropanol, n-butanol, isobutanol, 2-methoxyethanol, 2-ethoxyethanol, and mixtures thereof.

10. A method according to claim 1, wherein said sol solution incorporates water therein from at least one water source of the water of crystallization of said hydrate, the water in said solvent, and the moisture in the air at said first step.

* * * * *